US012701566B2

(12) United States Patent　　(10) Patent No.:　US 12,701,566 B2
Huang et al.　　　　　　　　　　　　(45) Date of Patent:　　　Aug. 4, 2026

(54) IAB HIERARCHICAL DU RESOURCE CONFIGURATION

(71) Applicant: Telefonaktiebolaget LM Ericsson (publ), Stockholm (SE)

(72) Inventors: Yezi Huang, Täby (SE); Lei Bao, Gothenburg (SE); Magnus Åström, Lund (SE); Boris Dortschy, Vendelsö (SE); Behrooz Makki, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 425 days.

(21) Appl. No.: 18/033,106

(22) PCT Filed: Oct. 22, 2021

(86) PCT No.: PCT/SE2021/051069
§ 371 (c)(1),
(2) Date: Apr. 21, 2023

(87) PCT Pub. No.: WO2022/086430
PCT Pub. Date: Apr. 28, 2022

(65) Prior Publication Data
US 2023/0388995 A1　　　Nov. 30, 2023

Related U.S. Application Data

(60) Provisional application No. 63/104,151, filed on Oct. 22, 2020.

(51) Int. Cl.
*H04W 72/12*　　　(2023.01)
*H04W 72/51*　　　(2023.01)

(52) U.S. Cl.
CPC ........... *H04W 72/12* (2013.01); *H04W 72/51* (2023.01)

(58) Field of Classification Search
CPC ..... H04W 72/12; H04W 72/51; H04W 28/16; H04W 24/02; H04W 84/047;
(Continued)

(56) References Cited

U.S. PATENT DOCUMENTS

2020/0145965 A1　5/2020　Luo et al.
2020/0146025 A1　5/2020　Choi et al.
(Continued)

FOREIGN PATENT DOCUMENTS

CN　　111436145 A　7/2020
EP　　3651526 A1　5/2020
(Continued)

OTHER PUBLICATIONS

Author Unknown, "Technical Specification Group Radio Access Network; NR; Study on Integrated Access and Backhaul; (Release 16)," Technical Report 38.874, Version 16.0.0, Dec. 2018, 3GPP Organizational Partners, 111 pages.
(Continued)

*Primary Examiner* — Kibrom T Hailu
(74) *Attorney, Agent, or Firm* — Withrow & Terranova, PLLC

(57) ABSTRACT

Systems and methods are disclosed for Integrated Access and Backhaul (IAB) hierarchical Distributed Unit (DU) resource configuration. In one embodiment, a method performed by an IAB node comprises determining a first multiplexing capability of the IAB node at a first time, sending information that is indicative of the first multiplexing capability of the IAB node to an IAB donor node, and receiving a first resource configuration profile from the IAB donor node. The method further comprises determining a second actual multiplexing capability of the IAB node at a second time that is subsequent to the first time and determining a valid resource configuration for the IAB node
(Continued)

RECEIVE A FIRST BASELINE RESOURCE CONFIGURATION PROFILE OF THE IAB DU
1400

RECEIVE A SECOND RESOURCE CONFIGURATION PROFILE OF THE IAB DU DEPENDING ON A CERTAIN MULTIPLEXING CAPABILITY OF THE IAB NODE
1402

RECEIVE AN ACTUAL MULTIPLEXING CAPABILITY OF THE IAB NODE
1404

DETERMINE A VALID RESOURCE CONFIGURATION OF THE IAB DU
1406

RECEIVE A VALID RESOURCE CONFIGURATION OF THE IAB-DU; IF SO, THE DETERMINED VALID RESOURCE CONFIGURATION IN THE PREVIOUS STEP IS DISREGARDED
1408

SEND AN ACK TO THE IAB NODE TO ASSUME THE VALID RESOURCE CONFIGURATION OF THE IAB DU
1410

SCHEDULE TRANSMISSION ON THE PARENT BACKHAUL LINK BASED ON THE DETERMINED VALID RESOURCE CONFIGURATION OF THE IAB-DU AND A DETERMINED VALID RESOURCE CONFIGURATION OF THE PARENT IAB-DU
1412 based on the second actual multiplexing capability of the IAB node. The method further comprises scheduling transmission on one or more child backhaul links and/or one or more access links of the IAB node based on the valid resource configuration.

13 Claims, 19 Drawing Sheets

(58) Field of Classification Search
CPC ... H04W 88/085; H04W 92/04; H04W 92/02; H04W 72/1263; H04L 5/0032; H04L 5/0094
See application file for complete search history.

(56) References Cited

U.S. PATENT DOCUMENTS

| | | | | |
|---|---|---|---|---|
| 2021/0084606 | A1* | 3/2021 | Abedini | H04W 80/02 |
| 2023/0309154 | A1* | 9/2023 | Kurita | H04L 5/0094 |
| 2023/0345553 | A1* | 10/2023 | Maya | H04W 56/0045 |

FOREIGN PATENT DOCUMENTS

| | | |
|---|---|---|
| WO | 2020032578 A1 | 2/2020 |
| WO | 2020144398 A1 | 7/2020 |
| WO | 2020144654 A1 | 7/2020 |
| WO | 2021205343 A1 | 10/2021 |

OTHER PUBLICATIONS

Author Unknown, "Technical Specification Group Radio Access Network; NG-RAN; F1 application protocol (F1AP) (Release 16)," Technical Specification 38.473, Version 16.3.1, Oct. 2020, 3GPP Organizational Partners, 455 pages.
AT&T, "R1-1901894: Mechanisms for resource coordination and radio-aware scheduling for IAB," 3GPP TSG RAN WG1 #96, Feb. 25-Mar. 1, 2019, Athens, Greece, 6 pages.
AT&T, "R1-2001160: Summary #2 of 7.2.3.3—Mechanisms for resource multiplexing among backhaul and access inks," 3GPP TSG-RAN WG1 Meeting #100-e, Feb. 24-Mar. 6, 2020, Electronic Meeting, 19 pages.
Huawei, et al., "R1-1901533: Resource multiplexing between backhaul and access in IAB," 3GPP TSG RAN WG1 Meeting #96, Feb. 25-Mar. 1, 2019, Athens, Greece, 8 pages.
Nokia, et al., "R1-1908987: Mechanisms for resource multiplexing among backhaul and access links, " 3GPP TSG RAN WG1 Meeting #98, Aug. 26-30, 2019, Prague, Czech Republic, 20 pages.
NTT DOCOMO, Inc., "R1-1902796: Mechanisms for resource multiplexing among backhaul and access links," 3GPP TSG RAN WG1 #96, Feb. 25-Mar. 1, 2019, Athens, Greece, 8 pages.
Qualcomm Incorporated, " R1-1902992: IAB Resource Management Framework," 3GPP TSG RAN WG1 Meeting #96, Feb. 25-Mar. 1, 2019, Athens, Greece, 8 pages.
Qualcomm, "RP-193251: New WID on Enhancements to Integrated Access and Backhaul," 3GPP TSG RAN Meeting #86, Dec. 9-12, 2019, Sitges, Spain, 5 pages.
Qualcomm, "RP-201293: New WID on Enhancements to Integrated Access and Backhaul," 3GPP TSG RAN Meeting #88e, Jun. 29-Jul. 3, 2020, Electronic Meeting, 5 pages.
Samsung, "R1-2001452: Corrections on integrated access and backhaul," 3GPP TSG-RAN WG1 Meeting #100-e, Feb. 24-Mar. 6, 2020, Electronic Meeting, 6 pages.
International Search Report and Written Opinion for International Patent Application No. PCT/SE2021/051069, mailed Dec. 16, 2021, 11 pages.
International Search Report and Written Opinion for International Patent Application No. PCT/IB2021/052852, mailed Jun. 16, 2021, 10 pages.
Cewit, "R1-2006329: Discussions on enhancements to resource multiplexing between child and parent links of an IAB node," 3GPP TSG RAN WG1 Meeting #102-e, Aug. 17-28, 2020, Electronic Meeting, 7 pages.
Examination Report for European Patent Application No. 21718661.8, mailed Oct. 18, 2023, 6 pages.
Extended European Search Report for European Patent Application No. 21883422.4, mailed Jul. 30, 2024, 5 pages.
Huawei, et al., "R1-1903938: Resource multiplexing between backhaul and access in IAB," 3GPP TSG RAN WG1 #96bis, Apr. 8-12, 2019, Xi'an, China, 12 pages.
NTT DOCOMO, Inc., "R1-2006744: Resource multiplexing between child and parent links of an IAB node," 3GPP TSG RAN WG1 #102-e, Aug. 17-28, 2020, Electronic Meeting, 3 pages.
Request for the Submission of an Opinion for Korean Patent Application No. 10-2023-7015077, mailed Jul. 18, 2025, 15 pages.
First Office Action for Chinese Patent Application No. 2021800859973, mailed Jan. 20, 2026, 9 pages.

* cited by examiner

DIRECTED ACYCLIC GRAPH

SPANNING TREE

*Arrows indicate directionality of the graph edge.*

FIG. 8

FREQUENCY-DOMAIN H/S/NA CONFIGURATION

TIME-DOMAIN RESOURCE CONFIGURATION

*Example of semi-static IAB-DU resource configurations provided by IAB-donor-CU*

*Example of valid time/frequency-domain NA configuration*

*Example of valid frequency-domain H/S/NA configuration*

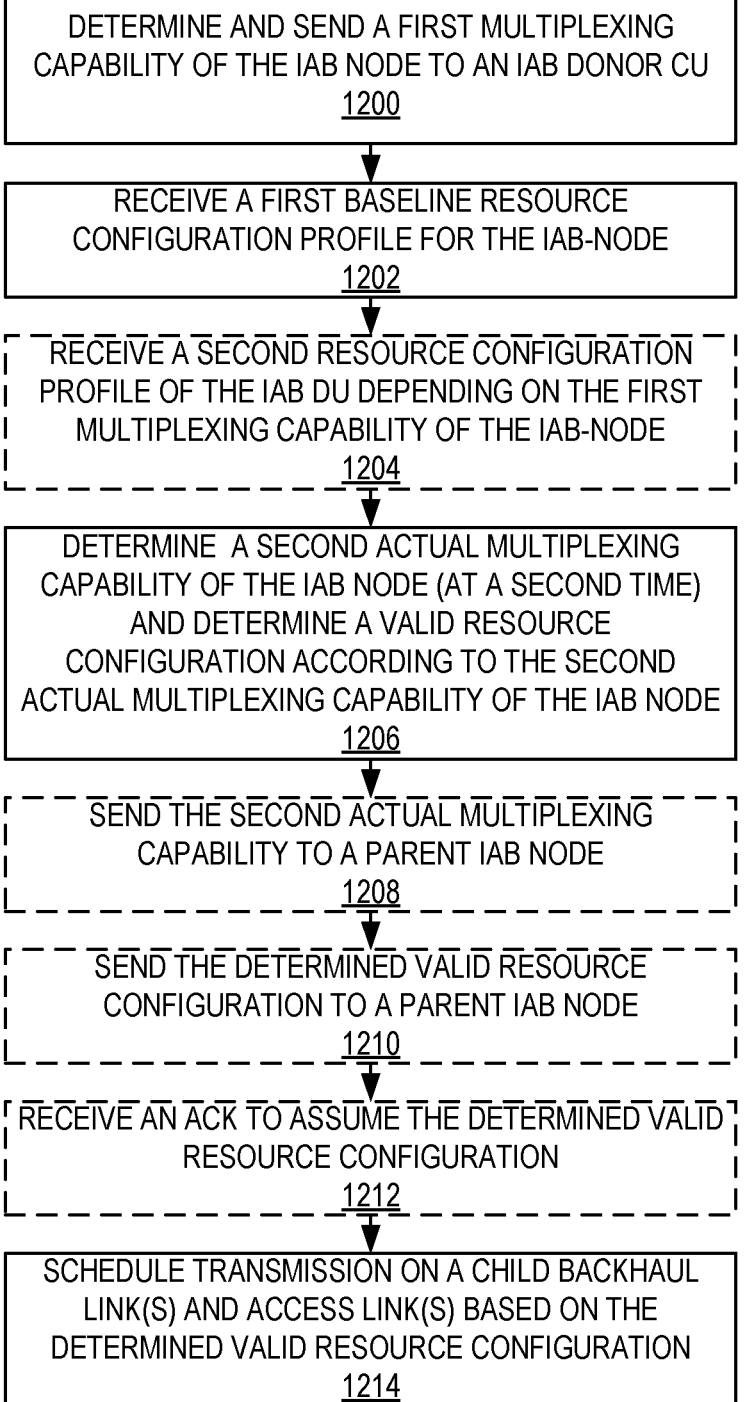

DETERMINE AND SEND A FIRST MULTIPLEXING CAPABILITY OF THE IAB NODE TO AN IAB DONOR CU
1200

RECEIVE A FIRST BASELINE RESOURCE CONFIGURATION PROFILE FOR THE IAB-NODE
1202

RECEIVE A SECOND RESOURCE CONFIGURATION PROFILE OF THE IAB DU DEPENDING ON THE FIRST MULTIPLEXING CAPABILITY OF THE IAB-NODE
1204

DETERMINE A SECOND ACTUAL MULTIPLEXING CAPABILITY OF THE IAB NODE (AT A SECOND TIME) AND DETERMINE A VALID RESOURCE CONFIGURATION ACCORDING TO THE SECOND ACTUAL MULTIPLEXING CAPABILITY OF THE IAB NODE
1206

SEND THE SECOND ACTUAL MULTIPLEXING CAPABILITY TO A PARENT IAB NODE
1208

SEND THE DETERMINED VALID RESOURCE CONFIGURATION TO A PARENT IAB NODE
1210

RECEIVE AN ACK TO ASSUME THE DETERMINED VALID RESOURCE CONFIGURATION
1212

SCHEDULE TRANSMISSION ON A CHILD BACKHAUL LINK(S) AND ACCESS LINK(S) BASED ON THE DETERMINED VALID RESOURCE CONFIGURATION
1214

FIG. 12

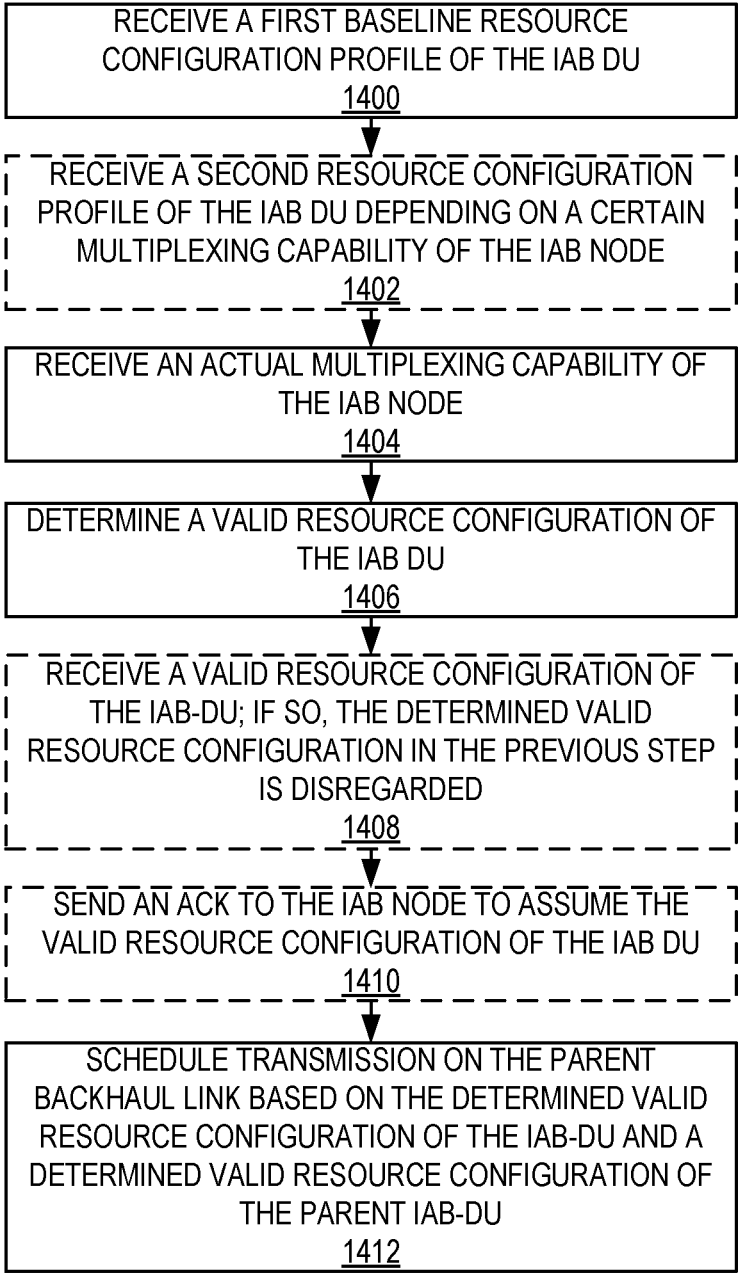

RECEIVE A FIRST BASELINE RESOURCE
CONFIGURATION PROFILE OF THE IAB DU
1400

RECEIVE A SECOND RESOURCE CONFIGURATION
PROFILE OF THE IAB DU DEPENDING ON A CERTAIN
MULTIPLEXING CAPABILITY OF THE IAB NODE
1402

RECEIVE AN ACTUAL MULTIPLEXING CAPABILITY OF
THE IAB NODE
1404

DETERMINE A VALID RESOURCE CONFIGURATION OF
THE IAB DU
1406

RECEIVE A VALID RESOURCE CONFIGURATION OF
THE IAB-DU; IF SO, THE DETERMINED VALID
RESOURCE CONFIGURATION IN THE PREVIOUS STEP
IS DISREGARDED
1408

SEND AN ACK TO THE IAB NODE TO ASSUME THE
VALID RESOURCE CONFIGURATION OF THE IAB DU
1410

SCHEDULE TRANSMISSION ON THE PARENT
BACKHAUL LINK BASED ON THE DETERMINED VALID
RESOURCE CONFIGURATION OF THE IAB-DU AND A
DETERMINED VALID RESOURCE CONFIGURATION OF
THE PARENT IAB-DU
1412

CONTROL SYSTEM
1502

NETWORK INTERFACE
1508

PROCESSOR(S)
1504

MEMORY
1506

RADIO UNIT(S)
1510

TX(S) 1512

RX(S) 1514

IAB NODE
1500

MODULE(S)
1600

IAB HIERARCHICAL DU RESOURCE CONFIGURATION

RELATED APPLICATIONS

This application is a 35 U.S.C. § 371 national phase filing of International Application No. PCT/SE2021/051069, filed Oct. 22, 2021, which claims the benefit of provisional patent application Ser. No. 63/104,151, filed Oct. 22, 2020, the disclosures of which are hereby incorporated herein by reference in their entireties.

TECHNICAL FIELD

The present disclosure relates to an Integrated Access and Backhaul (IAB) network and, more specifically, to IAB Distributed Unit (DU) resource configuration.

BACKGROUND

1 Integrated Access and Backhaul Overview

Densification via the deployment of an increasing number of base stations, whether they are macro or micro base stations, is one of the mechanisms that can be employed to satisfy the ever-increasing demand for more and more bandwidth/capacity in mobile networks. Due to the availability of more spectrum in the millimeter wave (mmw) band, deploying small cells that operate in this band is an attractive deployment option for these purposes. However, deploying fiber to the small cells, which is the usual way in which small cells are deployed, can end up being very expensive and impractical. Thus, employing a wireless link for connecting the small cells to the operator's network is a cheaper and practical alternative with more flexibility and shorter time-to-market. One such solution is an Integrated Access and Backhaul (IAB) network, where the operator can utilize part of the radio resources for the backhaul link.

In FIG. 1, an IAB deployment that supports multiple hops is presented. The IAB donor node (in short "IAB donor") has a wired or wireless connection to the core network, and the IAB nodes are wirelessly connected using Third Generation Partnership Project (3GPP) New Radio (NR) to the IAB donor, either directly or indirectly via another IAB node. The connection between IAB donor/node and User Equipments (UEs) is called the "access link", whereas the connection between two IAB nodes or between an IAB donor and an IAB node is called the "backhaul link".

Furthermore, as shown in FIG. 2, the adjacent upstream node which is closer to the IAB donor node of an IAB node is referred to as a "parent node" of the IAB node. The adjacent downstream node which is further away from the IAB donor node of an IAB node is referred to as a "child node" of the IAB node. The backhaul link between the parent node and the IAB node is referred to as "parent (backhaul) link", whereas the backhaul link between the IAB node and the child node is referred to as "child (backhaul) link".

2 IAB Architecture

As one major difference of the IAB architecture compared to Release 10 Long Term Evolution (LTE) relay (besides lower layer differences) is that the IAB architecture adopts the Central-Unit/Distributed-Unit (CU/DU) split of NR base stations (gNBs) in which time-critical functionalities are realized in the DU closer to the radio, whereas the less time-critical functionalities are pooled in the CU with the opportunity for centralization. Based on this architecture, an IAB-donor contains both CU and DU functions. In particular, it contains all CU functions of the IAB-nodes under the same IAB-donor. Each IAB-node then hosts the DU function(s) of a gNB. In order to be able to transmit/receive wireless signals to/from the upstream IAB-node or IAB-donor, each IAB-node has a mobile termination (MT), a logical unit providing a necessary set of UE-like functions. Via the DU, the IAB-node establishes Radio Link Control (RLC) channel to UEs and/or to MTs of the connected IAB-node(s). Via the MT, the IAB-node establishes the backhaul radio interface towards the serving IAB-node or IAB-donor. FIG. 3 shows a reference diagram for a two-hop chain of IAB-nodes under an IAB-donor.

3 IAB Topologies

Wireless backhaul links are vulnerable to blockage, e.g., due to moving objects such as vehicles, due to seasonal changes (foliage), due to severe weather conditions (e.g., rain, snow, or hail), or due to infrastructure changes (e.g., new buildings). Such vulnerability also applies to IAB-nodes. Also, traffic variations can create uneven load distribution on wireless backhaul links leading to local link or node congestion. In view of those concerns, the IAB topology supports redundant paths as another difference compared to the Release 10 LTE relay.

The following topologies are considered in IAB as shown in FIG. 4:

1. Spanning Tree (ST)
2. Directed Acyclic Graph (DAG)

Thus, one IAB node can have multiple child nodes and/or have multiple parent nodes. Particularly regarding multi-parent topology, different scenarios may be considered as shown in FIG. 5. For example:

IAB-9 connects to IAB-donor 1 via two parent nodes IAB-5 and IAB-6 which connect to the same grandparent node IAB-1;

IAB-10 connects to IAB-donor 1 via two parent nodes IAB-6 and IAB-7 which connect to different grandparent nodes IAB-1 and IAB-2;

IAB-8 connects to two parent nodes IAB-3 and IAB-4 which connect to different IAB donor nodes IAB-donor 1 and IAB-donor 2.

The multi-connectivity or route redundancy may be used for back-up purposes. It is also possible that redundant routes are used concurrently, e.g., to achieve load balancing, reliability, etc.

4 Resource Configuration 4.1 Time-Domain Resource Coordination

In case of in-band operation, the IAB-node is typically subject to the half-duplex constraint, i.e., an IAB-node can only be in either transmission or reception mode at a time. Release 16 IAB mainly considers the Time-Division Multiplexing (TDM) case where the MT and DU resources of the same IAB-node are separated in time. Based on this consideration, the following resource types have been defined for IAB MT and DU, respectively.

From an IAB-node MT point-of-view, as in Release 15, the following time-domain resources can be indicated for the parent link:

Downlink (DL) time resource

Uplink (UL) time resource

Flexible (F) time resource

From an IAB-node DU point-of-view, the child link has the following types of time resources:

DL time resource

UL time resource

F time resource

Not-available (NA) time resources (resources not to be used for communication on the DU child links)

Each of the downlink, uplink, and flexible time-resource types of the DU child link can belong to one of two categories:

Hard (H): The corresponding time resource is always available for the DU child link Soft (S): The availability of the corresponding time resource for the DU child link is explicitly and/or implicitly controlled by the parent node.

The IAB DU resources are configured per cell, and the H/S/NA attributes for the DU resource configuration are explicitly indicated per-resource type (D/U/F) in each slot. As a result, the semi-static time-domain resources of the DU part can be of seven types in total: Downlink-Hard (DL-H), Downlink-Soft (DL-S), Uplink-Hard (UL-H), Uplink-Soft (UL-S), Flexible-Hard (F-H), Flexible-Soft (F-S), and Not-Available (NA). The coordination relation between MT and DU resources are listed in Table 1.

One idea for such enhancement is to provide frequency-domain resource configuration. Comparing to the time-domain counterpart, one example of the frequency-domain DU resource configuration is shown in FIG. 7.

5 Capability Indication

To facilitate the resource configuration, 3GPP has agreed in RAN1#98bis that "[t]he donor CU and the parent node can be made aware of the multiplexing capability between MT and DU (TDM required, TDM not required) of an IAB node to for any {MT CC, DU cell} pair."

RAN1#99 has further detailed the indication of the multiplexing capability as:

"The indication of the multiplexing capability for the case of no-TDM between IAB MT and IAB DU is additionally provided with respect to each transmission-direction combination (per MT CC/DU cell pair):

TABLE 1

Coordination between MT and DU resources of an IAB-node.

| | | MT configuration | | |
|---|---|---|---|---|
| | | DL | UL | Flexible |
| DU configuration | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. |

Furthermore, a DU function may correspond to multiple cells, including cells operating on different carrier frequencies. Similarly, an MT function may correspond to multiple carrier frequencies. This can either be implemented by one MT unit operating on multiple carrier frequencies, or be implemented by multiple MT units, each operating on different carrier frequencies. The H/S/NA attributes for the per-cell DU resource configuration should take into account the associated MT carrier frequency(ies).

One example of such DU configuration is in FIG. 6.

4.2 Frequency-Domain Resource Configuration

One of the objectives in the Release 17 IAB WID RP-193251 (RP-201293, New WID on Enhancements to Integrated Access and Backhaul, Qualcomm, RAN #88e, June 2020) is to have "specification of enhancements to the resource multiplexing between child and parent links of an IAB node, including: support of simultaneous operation (transmission and/or reception) of IAB-node's child and parent links (i.e., MT Tx/DU Tx, MT Tx/DU Rx, MT Rx/DU Tx, MT Rx/DU Rx)."

MT-TX/DU-TX
MT-TX/DU-RX
MT-RX/DU-TX
MT-RX/DU-RX

The corresponding signaling has been defined in 3GPP Technical Specification (TS) 38.473, clause 9.3.1.108 (see, e.g., V16.3.1) as part of the F1 application protocol (F1-AP) information element (IE), which is an L3 signaling.

SUMMARY

Systems and methods are disclosed for Integrated Access and Backhaul (IAB) hierarchical Distributed Unit (DU) resource configuration. In one embodiment, a method performed by an IAB node in a radio access network comprises determining a first multiplexing capability of the IAB node at a first time, sending information that is indicative of the first multiplexing capability of the IAB node at the first time to an IAB donor node, and receiving a first resource configuration profile for the IAB node from the IAB donor node.

The method further comprises determining a second actual multiplexing capability of the IAB node at a second time that is subsequent to the first time, and determining a valid resource configuration for the IAB node based on the second actual multiplexing capability of the IAB node. The method further comprises scheduling transmission on one or more child backhaul links and/or one or more access links of the IAB node based on the valid resource configuration.

In one embodiment, each of the first multiplexing capability and second actual multiplexing capability depicts how an IAB Mobile Termination (IAB-MT) of the IAB node and an IAB Distributed Unit (IAB-DU) of the IAB node can make use of shared time and/or frequency radio resources.

In one embodiment, each of the first multiplexing capability and second actual multiplexing capability is one of Time Division Multiplexing (TDM) or Frequency Division Multiplexing (FDM) or Spatial Division Multiplexing (SDM).

In one embodiment, each of the first multiplexing capability and second actual multiplexing capability is one of TDM required or TDM not required.

In one embodiment, the method further comprises receiving a second resource configuration profile for the IAB node from the IAB donor node, wherein determining the valid resource configuration for the IAB node comprises determining the valid resource configuration for the IAB node based on the second actual multiplexing capability of the IAB node and a combination of the first resource configuration profile and the second resource configuration profile subject to one or more predefined or preconfigured rules. In one embodiment, the first resource configuration profile comprises Hard (H), Soft (S), and Not Available (NA) resource classifications associated with time-domain resources, the second resource configuration profile comprises H, S, and NA resource classifications associated with frequency-domain resources, and the one or more predefined or preconfigured rules comprise one or more of the following rules: a rule that a NA resource classification cannot be overridden, a rule that H and S classifications can be overridden by a NA resource classification, a rule that a S resource classification can override a H resource classification and cannot be overridden by a H classification, and a rule that a H resource classification cannot override a NA resource classification nor a S resource classification. In another embodiment, the first resource configuration profile comprises H, S, and NA resource classifications associated with time-domain resources, the second resource configuration profile comprises H, S, and NA resource classifications associated with frequency-domain resources, and the one or more predefined or preconfigured rules comprise one or more of the following rules: a rule that a H resource classification cannot be overridden, a rule that a H resource classification can override a S resource classification and a NA resource classification, a rule that a S resource classification can override a NA resource classification and cannot be overridden by a NA resource classification, and a rule that a NA resource classification cannot override a H resource classification nor a S resource classification.

In one embodiment, the method further comprises receiving a second resource configuration profile for the IAB node from the IAB donor node, wherein determining the valid resource configuration for the IAB node comprises determining the valid resource configuration for the IAB node based on the first resource configuration profile and/or the second resource configuration profile.

In one embodiment, determining the valid resource configuration for the IAB node comprises determining the valid resource configuration for the IAB node per cell.

In one embodiment, determining the valid resource configuration for the IAB node comprises determining the valid resource configuration for the IAB node per link.

In one embodiment, the first resource configuration profile comprises information that indicates downlink, uplink, and flexible resources. In one embodiment, the first resource configuration profile further comprises information that configures the downlink, uplink, and flexible resources associated with H, S, and NA resources. In one embodiment, the first resource configuration profile is per cell and/or per link.

In one embodiment, time- or frequency-domain resources for semi-static or cell-specific signals or channels, such as Synchronization Signal (SS)/Physical Broadcast Channel (PBCH) block (SSB), Physical Random Access Channel (PRACH), periodical Channel State Information Reference Signal (CSI-RS), System Information (SI), and Scheduling Request (SR), are treated as Hard (H) resources, even if Not Available (NA) or Soft (S) resource is configured.

In one embodiment, the method further comprises sending the second actual multiplexing capability to a parent IAB node.

In one embodiment, the method further comprises sending an indication of the valid resource configuration to a parent IAB node. In one embodiment, the method further comprises receiving an acknowledgment to assume the valid resource configuration.

Corresponding embodiments of an IAB node for a radio access network are also disclosed. In one embodiment, an IAB node for a radio access network is adapted to determine a first multiplexing capability of the IAB node at a first time, send information that is indicative of the first multiplexing capability of the IAB node at the first time to an IAB donor node, and receive a first resource configuration profile for the IAB node from the IAB donor node. The IAB node is further adapted to determine a second actual multiplexing capability of the IAB node at a second time that is subsequent to the first time, determine a valid resource configuration for the IAB node based on the second actual multiplexing capability of the IAB node, and schedule transmission on one or more child backhaul links and/or one or more access links of the IAB node based on the valid resource configuration.

In one embodiment, an IAB node for a radio access network comprises one or more transmitters, one or more receivers, and processing circuitry associated with the one or more transmitters and the one or more receivers. The processing circuitry is configured to cause the IAB node to determine a first multiplexing capability of the IAB node at a first time, send information that is indicative of the first multiplexing capability of the IAB node at the first time to an IAB donor node, and receive a first resource configuration profile for the IAB node from the IAB donor node. The processing circuitry is further configured to cause the IAB node to determine a second actual multiplexing capability of the IAB node at a second time that is subsequent to the first time, determine a valid resource configuration for the IAB node based on the second actual multiplexing capability of the IAB node, and schedule transmission on one or more child backhaul links and/or one or more access links of the IAB node based on the valid resource configuration.

Embodiments of a method performed by an IAB donor node are also disclosed. In one embodiment, a method performed by an IAB donor node comprises receiving a first multiplexing capability of an IAB node and sending first resource configuration to the IAB node.

In one embodiment, the first multiplexing capability of the IAB node is FDM, and the first resource configuration sent to the IAB node is in time domain.

In one embodiment, the method further comprises sending a second resource configuration profile to the IAB node based on the first multiplexing capability of the IAB node.

In one embodiment, the method further comprises sending a first resource configuration profile and optionally a second resource configuration profile of one or more IAB nodes that are in a same IAB chain as the IAB node to the respective IAB nodes.

Corresponding embodiments of an IAB donor node are also disclosed. In one embodiment, an IAB donor node is adapted to receive a first multiplexing capability of an IAB node and send first resource configuration to the IAB node.

In one embodiment, an IAB donor node comprises one or more transmitters, one or more receivers, and processing circuitry associated with the one or more transmitters and the one or more receivers. The processing circuitry is configured to cause the IAB donor node to receive a first multiplexing capability of an IAB node and send first resource configuration to the IAB node.

Embodiments of a method performed by a parent IAB node in a radio network are also disclosed. In one embodiment, a method performed by a parent IAB node in a radio access network comprises receiving a first resource configuration profile of an IAB node, the IAB node being a child IAB node of the parent IAB node. The method further comprises receiving an actual multiplexing capability of the IAB node, determining a valid resource configuration of the IAB node based on the actual multiplexing capability of the IAB node, and scheduling transmission on a parent backhaul link based on the valid resource configuration of the IAB node and a determined valid resource configuration of the parent IAB node.

Corresponding embodiments of a parent IAB node in a radio access network are also disclosed. In one embodiment, a parent IAB node for a radio access network is adapted to receive a first resource configuration profile of an IAB node, the IAB node being a child IAB node of the parent IAB node. The parent IAB node is further adapted to receive an actual multiplexing capability of the IAB node, determine a valid resource configuration of the IAB node based on the actual multiplexing capability of the IAB node, and schedule transmission on a parent backhaul link based on the valid resource configuration of the IAB node and a determined valid resource configuration of the parent IAB node.

In one embodiment, a parent IAB node for a radio access network comprises one or more transmitters, one or more receivers, and processing circuitry associated with the one or more transmitters and the one or more receivers. The processing circuitry is configured to cause the parent IAB node to receive a first resource configuration profile of an IAB node, the IAB node being a child IAB node of the parent IAB node. The processing circuitry is further configured to cause the parent IAB node to receive an actual multiplexing capability of the IAB node, determine a valid resource configuration of the IAB node based on the actual multiplexing capability of the IAB node, and schedule transmission on a parent backhaul link based on the valid resource configuration of the IAB node and a determined valid resource configuration of the parent IAB node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates one example of a radio access network (RAN) having an IAB architecture in which embodiments of the present disclosure may be implemented;

FIG. 12 is a flow chart that illustrates the operation of an IAB node for dynamically determining a valid IAB DU resource configuration based on (e.g., semi-static) IAB DU resource configuration(s) of the IAB node in accordance with embodiments of the present disclosure;

FIG. 14 is a flow chart that illustrates the operation of a parent IAB node in accordance with embodiments of the present disclosure;

DETAILED DESCRIPTION

Figure 1:
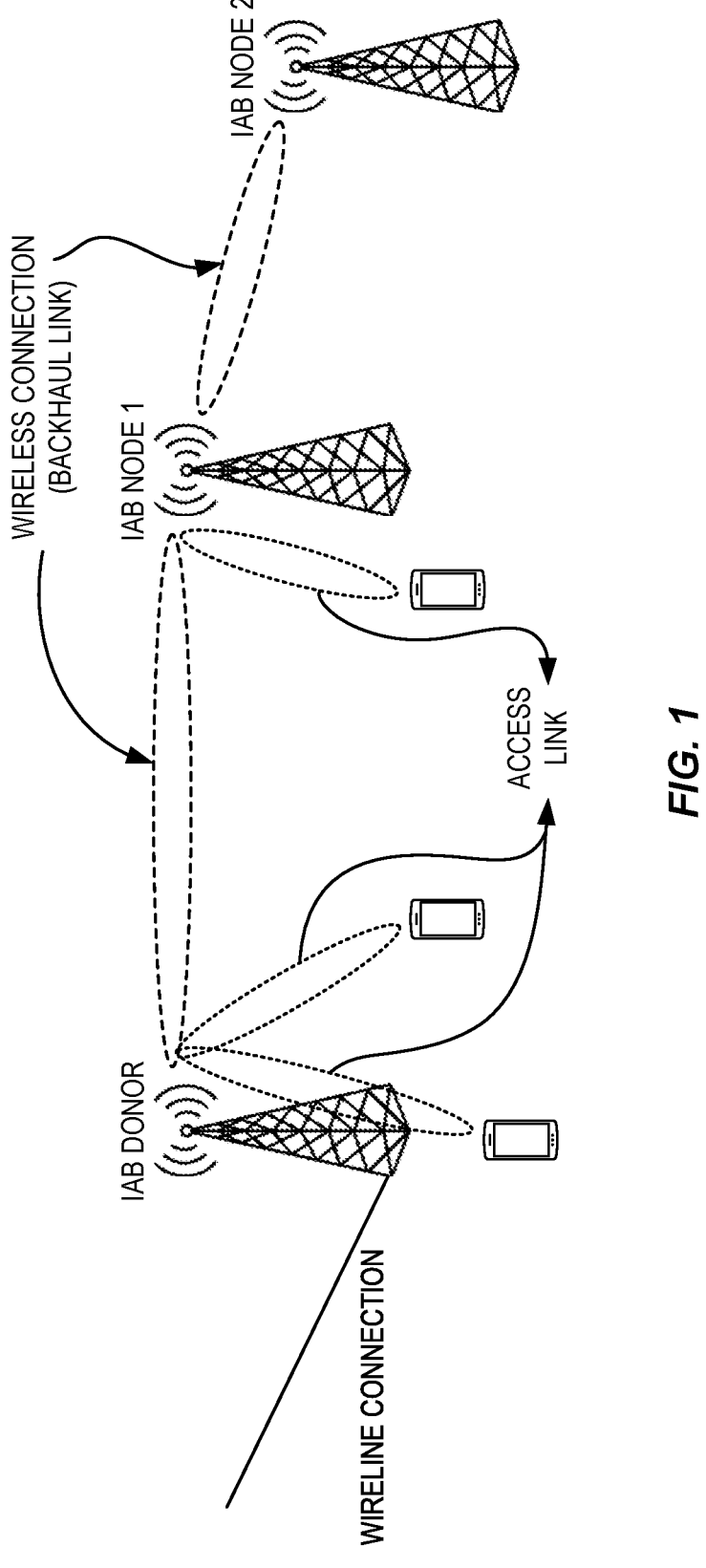
FIG. 1 illustrates an Integrated Access and Backhaul (IAB) deployment that supports multiple hops.
Figure 2:
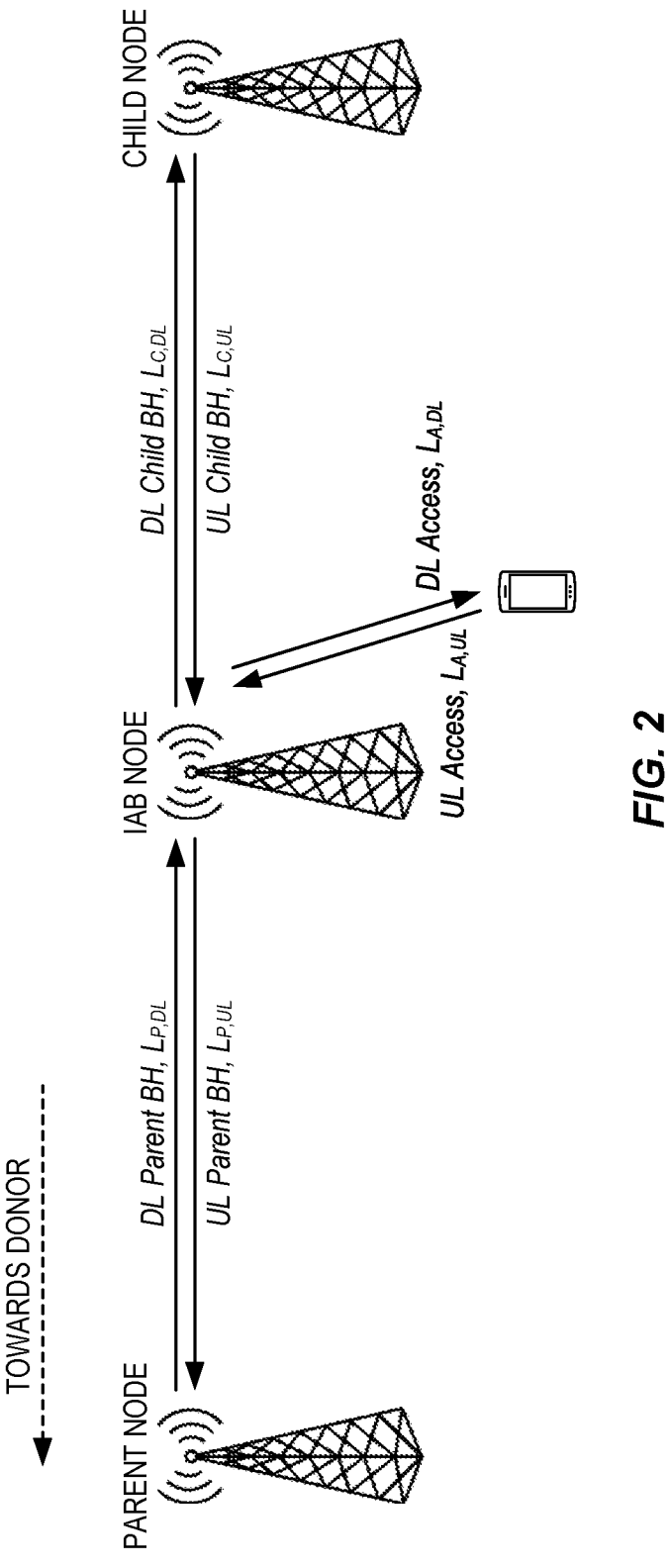
FIG. 2 illustrates IAB terminology in adjacent hops.
Figure 3:
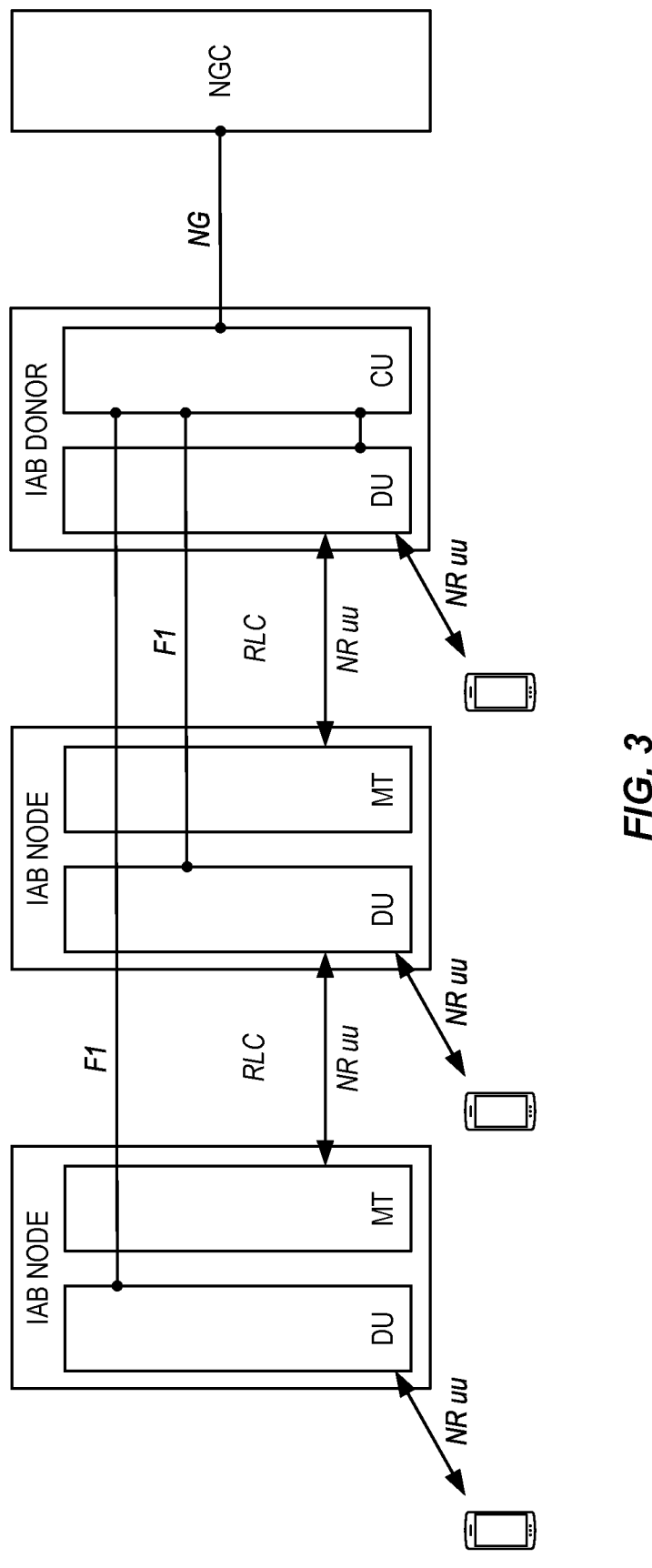
FIG. 3 illustrates one example of an IAB architecture.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

IAB Node: As used herein, an Integrated Access and Backhaul (IAB) node is a RAN node that supports wireless access to UEs and wirelessly backhauls the access traffic.

IAB Donor Node: As used herein, an IAB donor node or IAB donor is a node that connects to the core network (e.g., via wired connection such as, e.g., a fiber connection). The IAB donor includes a Central Unit (CU). Note that an IAB donor node may also include a Distributed Unit (DU) and thereby be a parent IAB node.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The Central Unit (CU) of the IAB Donor (also referred to herein as the "IAB-donor-CU") conducts semi-static IAB Distributed Unit (IAB-DU) and IAB Mobile Termination (IAB-MT) resource configuration of the IAB node based on the multiplexing capability information of the IAB node provided to the IAB-donor-CU. According to 3GPP Technical Specification (TS) 38.473 V16.3.1, such information is provided by F1-Application Protocol (F1-AP) which handles less time-critical information. However, the actual multiplexing capability (i.e., the current multiplexing capability) of the IAB node in terms of whether the IAB-MT and IAB-DU can use certain time/frequency resource simultaneously or not may be changed locally and dynamically. Note that the actual, or current, multiplexing capability, which can change, e.g., based on the current conditions, is to be differentiated from the static multiplexing capability of the IAB node (i.e., what modes of operation the IAB node supports). The changing of the actual multiplexing capability of the IAB node leads to the semi-static resource configuration provided to the IAB node being inconsistent with the actual IAB multiplexing capability. Therefore, semi-static resource configuration possibly cannot be carried out by the IAB node because of the inconsistency between the semi-static resource configuration and the actual IAB node multiplexing capability.

Certain aspects of the present disclosure and their embodiments may provide solutions to the aforementioned or other challenges. Systems and methods are disclosed herein for providing a hierarchical configuration (e.g., specifically regarding Hard (H)/Soft (S)/Not Available (NA) resource types) of the IAB-DU resources based on the (e.g., semi-static) multiplexing capability of the IAB node.

Figure 4:
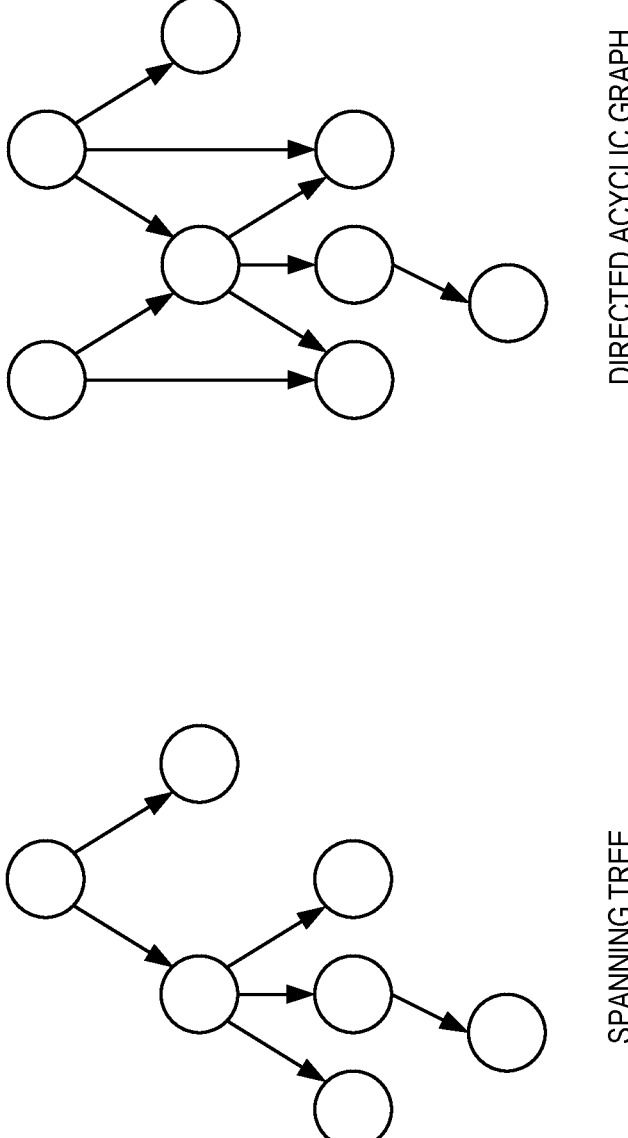
FIG. 4 illustrates two example IAB topologies.
Figure 5:
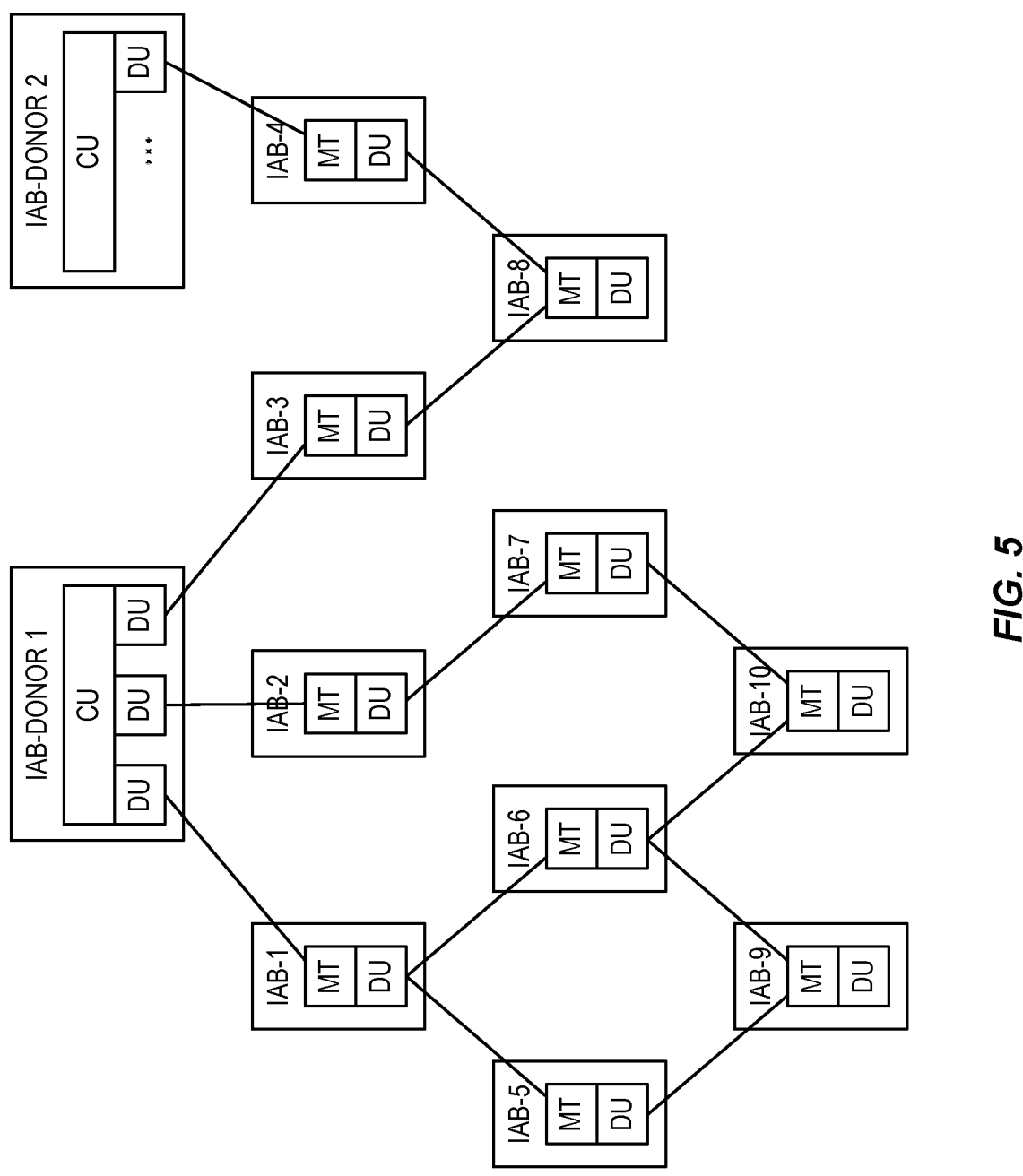
FIG. 5 illustrates examples of different multi-parent IAB scenarios.
Figure 6:
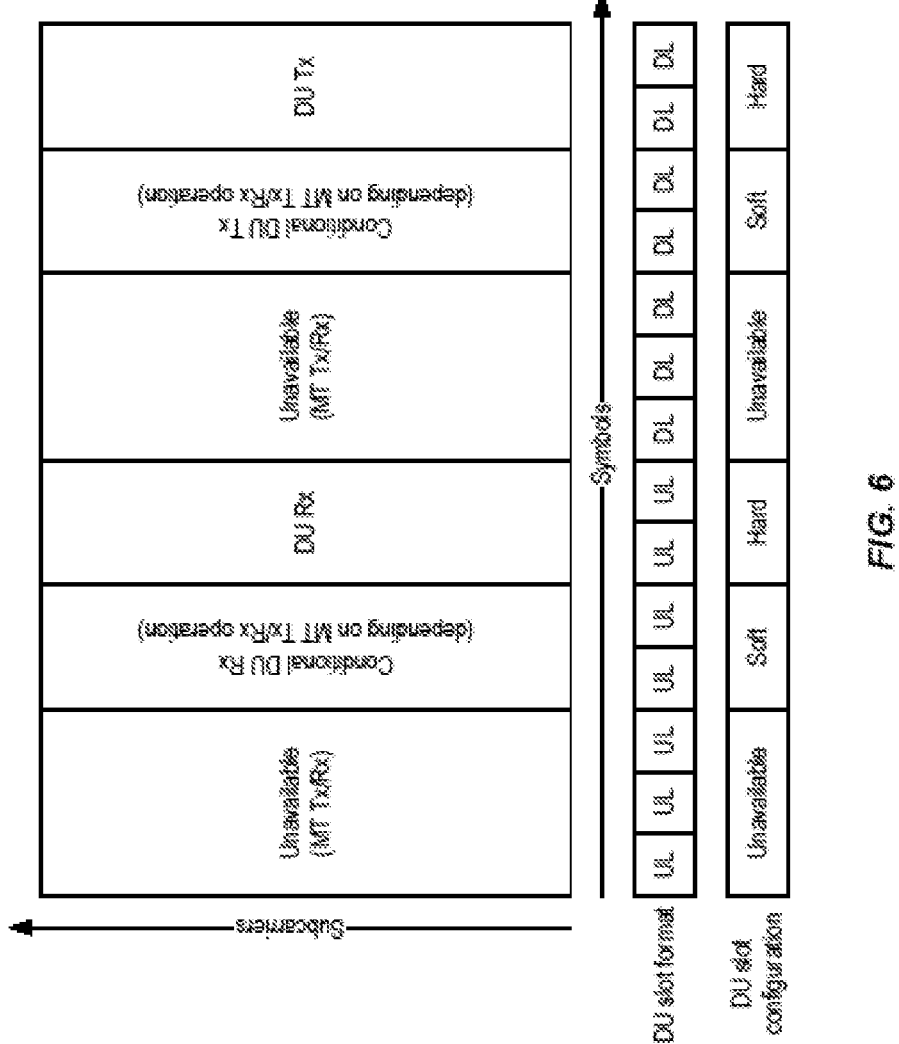
FIG. 6 illustrates one example of a time-domain IAB Distributed Unit (DU) resource configuration.
Figure 8:
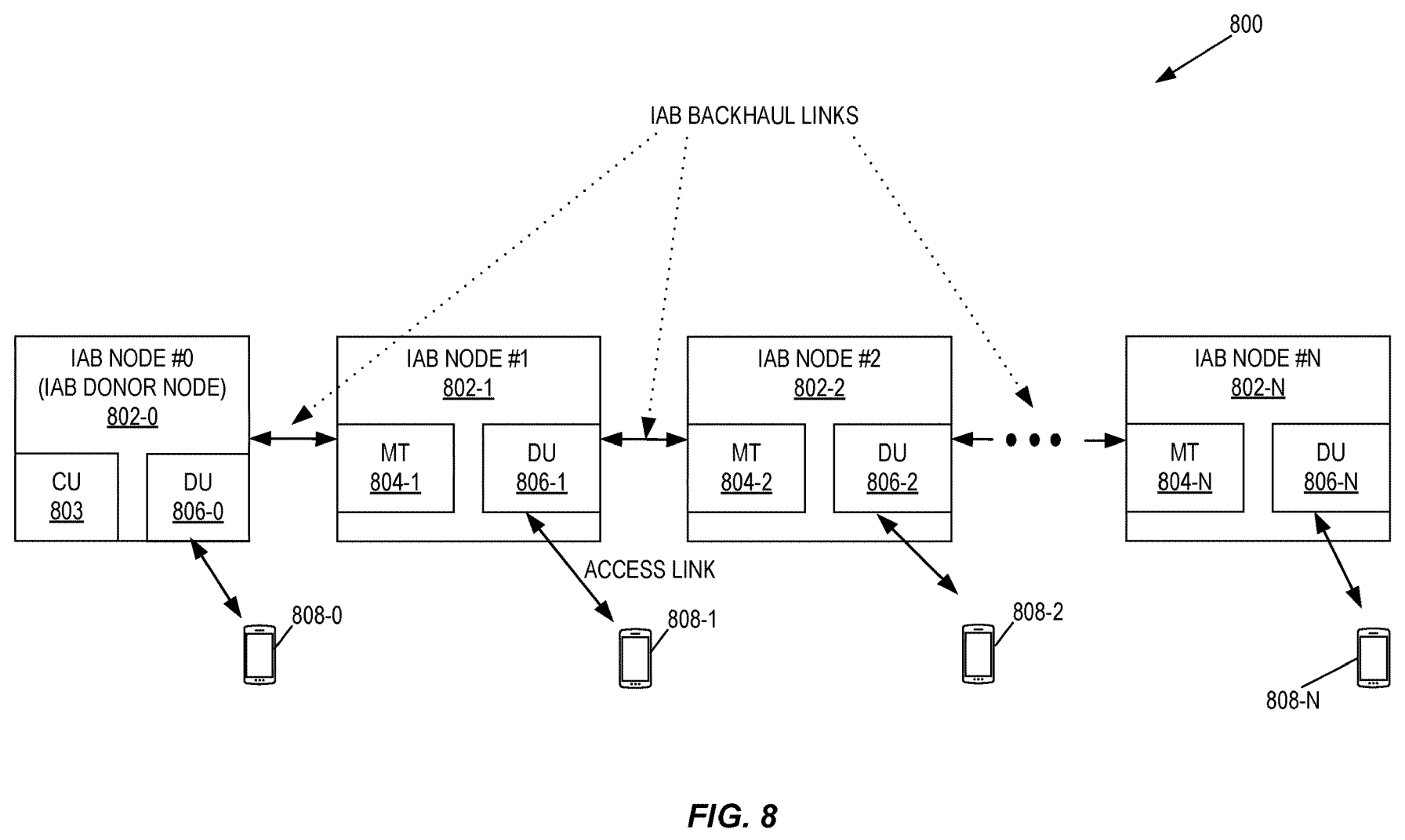

Certain embodiments may provide one or more of the following technical advantage(s). In some embodiments, a semi-static IAB-DU resource configuration profile is provided to an IAB node that is adaptive to possible local changes of the actual multiplexing capability of the IAB node. As a result, the IAB node always has a valid semi-static DU resource configuration to refer to even if its actual multiplexing capability is dynamically changed compared to what has been indicated to the IAB-donor-CU. The IAB-donor-CU still has control of resource coordination between IAB nodes under it. FIG. 8 illustrates one example of a radio access network (RAN) 800 having an IAB architecture in which embodiments of the present disclosure may be implemented. Note that optional features are represented by dashed lines/boxes. In the embodiments described herein, the RAN 800 is a Next Generation RAN (NG-RAN) (which is part of a System (5GS) which includes the NG-RAN and a Fifth Generation Core (5GC)) or an Evolved Universal Terrestrial Radio Access Network (E-UTRAN) (which is part of an Evolved Packet System (EPS) which includes the E-UTRAN and an Evolved Packet Core (EPC)). As will be appreciated by those of skill in the art, the RAN 800 includes an IAB donor node 802-0 and a number of IAB nodes 802-1 to 802-N. The IAB donor node 802-0 and the IAB nodes 802-1 through 802-N are, in some embodiments, base stations (e.g., gNBs, ng-eNBs, or eNBs). The IAB donor node 802-0 preferably has a wired backhaul connection to the core network (not shown) and includes a CU 803, which is sometimes referred to herein as "IAB-donor-CU". The IAB donor node 802-0 also includes a respective DU 806-0. The IAB nodes 802-1 through 802-N include respective MTs 804-1 through 804-N and respective DUs 806-1 through 806-N. The MTs 804-1 through 804-N are sometimes referred to herein as IAB-MTs 804-1 through 804-N. Likewise, the DUs 806-0 through 806-N are sometimes referred to herein as IAB-DUs 806-0 through 806-N. The IAB donor node 802-0 and the IAB nodes 802-1 through 802-N provide radio access to respective UEs 808-0 through 808-N via IAB_DUs 806-0 through 806-N. Note that only one UE 808 is illustrated for the IAB donor node 802-0 and each of the IAB nodes 802-1 through 802-N for clarity, it should be appreciated that the IAB donor node 802-0 and each of the IAB nodes 802-1 through 802-N may provide radio access to many UEs 808. Further, a single IAB donor node 802-0 or a single IAB node 802-i may provide backhauling to multiple child IAB nodes. It should also be noted that the topology of IAB architecture illustrated in FIG. 8 is only an example. Other topologies may be used (see, e.g., the spanning tree topology and the DAG topology of FIG. 4).

Note that, as used herein, an IAB node 802-i (also referred to herein as a "network IAB node") refers to an i-th IAB node, where "i" is any value in the range of 1 to N. The IAB node 802-p (e.g., wherein p=i−1 in the example of FIG. 8) is referred to as a "parent IAB node" of the IAB node 802-i, and the IAB node 802-c (e.g., wherein c=i+1 in the example of FIG. 8) is referred to as a "child IAB node" of the IAB node 802-i.

The semi-static resource configuration of an IAB node 802-i is provided by the IAB-donor-CU 803. Multiplexing capability of the IAB node 802-i, in terms of whether the IAB-MT 804-i and the IAB-DU 806-i can or cannot use certain resources simultaneously, is referred to specifically when configuring the Hard/Soft/Not-available (H/S/NA) resource classifications. For example, if the IAB-node 802-i is indicated as "TDM not required" (or the equivalent) in MT-Rx/DU-Rx, and the parent IAB-DU 806-p is configured as DL-H in a certain slot, the IAB-DU 806-i can be configured as UL-H in the same slot. Otherwise, the IAB-donor-CU 803 may configure UL-S or NA at the IAB-DU 806-i to avoid predictable resource conflicts at the IAB-node 802-i.

To better utilize radio resources with respect to the actual multiplexing capability of an IAB-node 802-i, a method to configure a frequency-domain multiplexing (FDM)-capable IAB node with frequency-domain H/S/NA instead of time-domain H/S/NA as defined in Release 16 has been proposed (see, e.g., International Patent Application Publication No. WO/2021/205343, entitled FREQUENCY DOMAIN RESOURCE CONFIGURATION IN IAB, having an international filing date of Apr. 6, 2021 and a priority date of Apr. 6, 2020). This method enables possibilities for the IAB-MT 804-i and IAB-DU 806-i to have different priorities regarding different frequency-domain resources associated with the same time-domain resource, and thereby introducing higher scheduling flexibility to the IAB network. Further, when the IAB-node 802-i is capable of performing space-division multiplexing (SDM) between the IAB-MT 804-i and IAB-DU 806-i, no H/S (neither in time nor in frequency-domain) is needed since the IAB-MT 804-i and IAB-DU 806-i can use both time and frequency-domain resource simultaneously. So, it is beneficial to have H/S/NA for the IAB-DU 806-i configured and relevant based on the actual multiplexing capability of the IAB-node 802-i, which (or at least some information about the actual multiplexing capability) is provided from the IAB-node 802-i to the IAB-donor-CU 803.

However, the actual multiplexing capability of the IAB-node 802-i may change due to local circumstances, such as channel changes, fulfillment of simultaneous operation criteria, etc., in a dynamic way. Such change may not be captured by the IAB-donor-CU 803 in time. Also, from the system stability, consistency, and signaling efficiency point-of-view, semi-static resource configuration is not supposed to be changed frequently. So, if an H/S/NA resource configuration for the IAB-DU 806-i is only configured based on the multiplexing capability (e.g., semi-static multiplexing capability) of the IAB-node 802-i received by the IAB-donor-CU 803 at some time, it might happen that the H/S/NA configuration provided to the IAB-node 802-i becomes inconsistent with the actual multiplexing capability of the IAB node 802-i, which changes dynamically; therefore the intended H/S/NA configuration cannot be used by the IAB-node 802-i.

Figure 7:
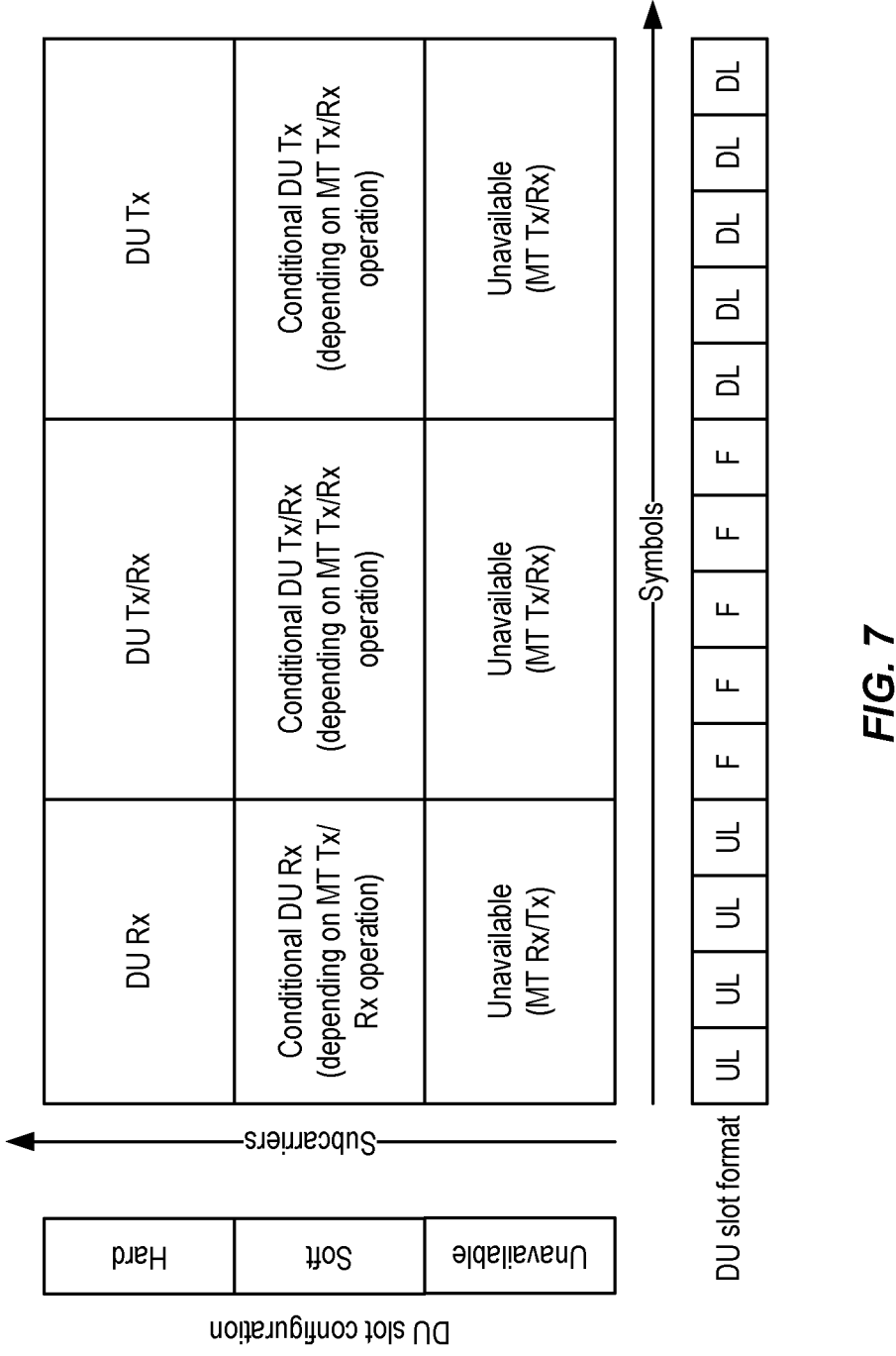
FIG. 7 illustrates one example of a frequency-domain IAB DU resource configuration.

An example of such problem is as follows. An IAB-node 802-i indicates that it is FDM-capable to the IAB-donor-CU 803, and accordingly receives a frequency-domain H/S/NA configuration from the IAB-donor-CU 803 as exemplified in FIG. 7. Due to certain condition changes, it can happen that the IAB-MT 804-i and IAB-DU 806-i cannot achieve simultaneous operation on different frequencies anymore. One such concrete case is if a UE 808 that is served by the IAB-node 802-i is located in the direction of the parent IAB-DU 806-p, and the IAB-node 802-i is unable to sufficiently separate the transmission and reception signals between the parent IAB node 802-*p* and the UE 808. Then the IAB-node 802-*i* has to run in a TDM mode. In this case, the IAB-node 802-*i* cannot carry out the expected operation if part of the frequency resources are configured as Hard (which gives the priority to the IAB-DU 806-*i*) while other frequency resources are configured as Soft (which gives the priority to the IAB-MT 804-*i*) at the same time slot.

To solve this problem, embodiments of the present disclosure provide methods to have the semi-static configuration of H/S/NA adaptive to potential changes of actual multiplexing-capability at the IAB-node 802-*i*. Thanks to the hierarchical structure of the provided semi-static H/S/NA configuration(s), the used H/S/NA resource configuration according to the actual multiplexing capability of the IAB-node 802-*i* will not disturb the fulfillment of semi-static configuration of other IAB-nodes in the same (multi-hop) IAB chain.

In terms of resource utilization efficiency, SDM, where IAB-MT 804-*i* and IAB-DU 806-*i* can share the same time and frequency resources, is better than FDM, where IAB-MT 804-*i* and IAB-DU 806-*i* can share the same time resource. TDM stays the lowest in this rank since the IAB-MT 804-*i* and the IAB-DU 806-*i* need to alternate operation in time. Note that the Hard and Soft resource types are not necessary for time- and frequency-domain resources if the IAB-node 802-*i* is capable of SDM, whereas NA resource type may still be needed for coordination between different IAB-nodes. In one embodiment, the IAB-donor-CU 803 provides semi-static resource configurations to the IAB-node 802-*i* based on the indicated multiplexing capability of the IAB-node 802-*i* (which may be to be differentiated from the actual multiplexing capability of the IAB node 802-*i*) as summarized in Table 2, where the time-domain resource configuration is the baseline configuration. The IAB-node 802-*i* derives the valid resource configuration according to certain overriding rules. The actually used configuration at the IAB-node 802-*i* is based on the actual multiplexing capability that the IAB-node 802-*i* may dynamically determine.

TABLE 2

Relation between the indicated capability of an IAB-node and the provided resource configuration to the IAB-node

| Indicated capability to IAB-donor-CU | IAB-donor-CU provides to IAB-node | IAB-node may derive based on overriding rules |
|---|---|---|
| TDM | Time-domain resource configuration | Time-domain resource configuration |
| FDM | Time-domain resource configuration | Time-domain resource configuration |
| | Frequency-domain H/S/NA configuration | Valid frequency-domain H/S/NA configuration |
| SDM | Time-domain resource configuration | Time-domain resource configuration |
| | Frequency-domain H/S/NA configuration | Valid frequency-domain H/S/NA configuration |
| | | Valid time/frequency-domain NA configuration |

Note that FDM and SDM may be indicated to the IAB-donor-CU 803 generally as "TDM not required". In this case, the IAB-donor-CU 803 provides both time and frequency domain configurations to the IAB-node 802-*i*. The IAB-node 802-*i* derives the valid resource configuration it actually needs. The IAB-donor-CU 803 may also provide per-link/beam NA configuration to the IAB-DU 806-*i*. The per-link/beam NA configuration may be independent of the indicated capability to the IAB-donor-CU 803.

One example of the configuration in accordance with an embodiment of the present disclosure is as follows. The overriding rule in this example is that:

NA resource classification cannot be overridden, whereas NA can override Hard and Soft classifications;
    Soft resource classification can override Hard classification and cannot be overridden by Hard classification;
    Hard resource classification cannot override NA nor Soft classification.

Figure 9:
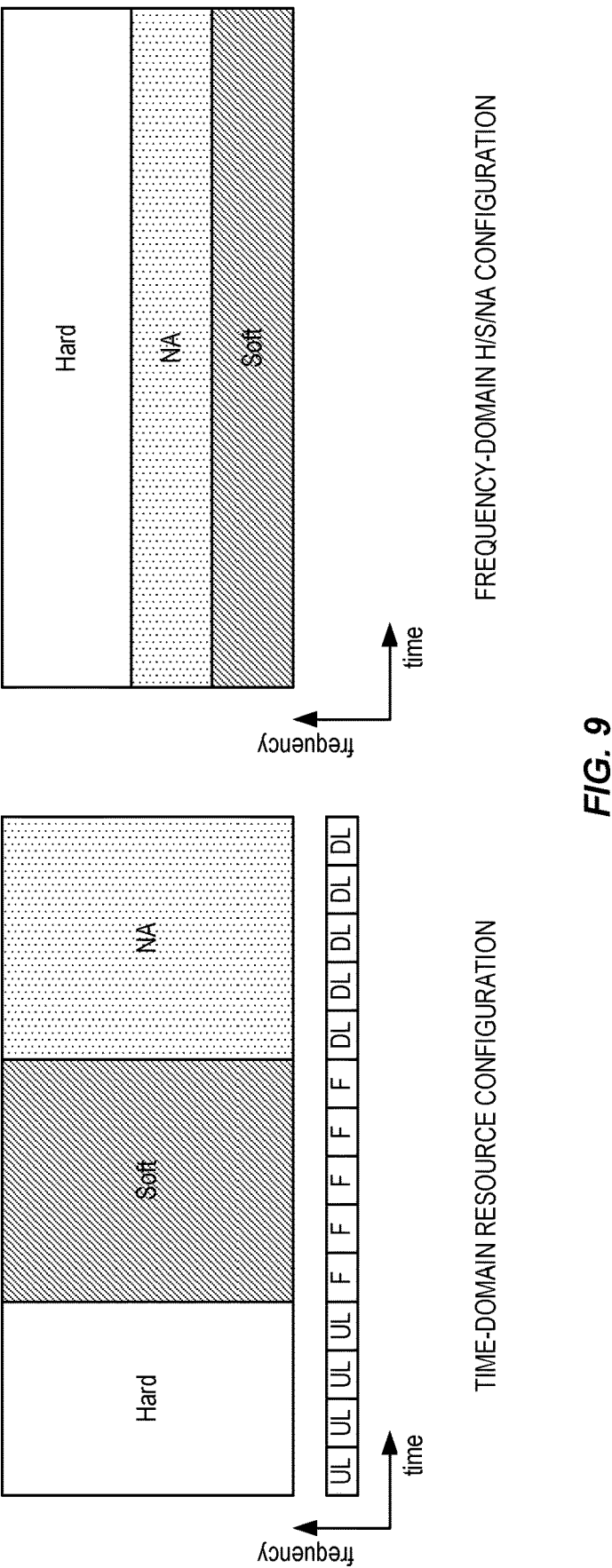
FIG. 9 illustrates one example of semi-static IAB DU resource configurations provided by an IAB donor Central Unit (CU) in accordance with an embodiment of the present disclosure.

The IAB-node 802-*i* indicates SDM-capability to the IAB-donor-CU 803 and thereby receives both time-domain and frequency-domain resource configurations as exemplified in FIG. 9. The time- and frequency-domain configurations may further correspond to different releases, e.g., time-domain corresponds to Release 16 and frequency-domain to Release 17.

Figure 10:
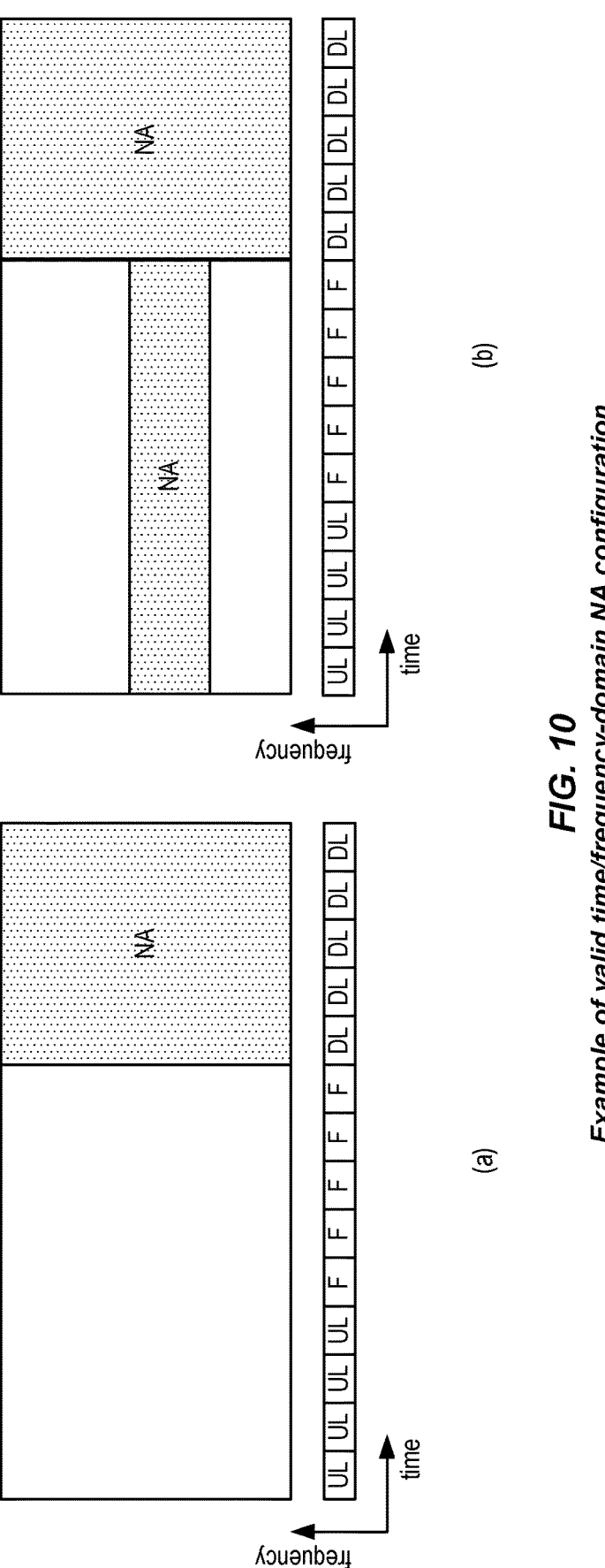
FIG. 10 illustrates two examples of valid time/frequency-domain Not Applicable (NA) configurations determined based on the semi-static IAB-DU resource configurations of FIG. 10 in accordance with one embodiment of the present disclosure.

As the IAB-node 802-*i* is capable of SDM, Hard or Soft resource types do not make any difference for the IAB-MT 804-*i* and IAB-DU 806-*i* when making use of certain resources. It may only care about the NA resource type. In one embodiment, the IAB-node 802-*i* disregards H/S/NA resource types configured in time and/or frequency domain. In another embodiment, the IAB-node 802-*i* derives the valid DU resource configuration only based on the provided time-domain NA configuration, resulting in a valid resource configuration as illustrated in FIG. 10(*a*). In another embodiment, the IAB-node 802-*i* derives the valid DU resource configuration based both on the provided time and frequency-domain NA configurations, resulting in a valid resource configuration as illustrated in FIG. 10(*b*).

Figure 11:
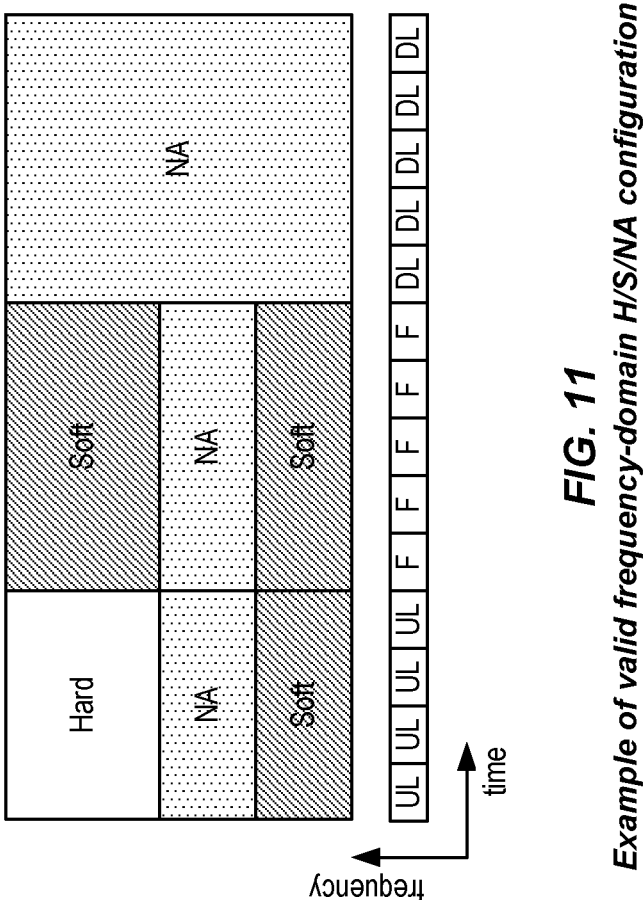
FIG. 11 illustrates one example of valid frequency-domain Hard (H)/Soft (S)/NA configuration determined based on the semi-static IAB-DU resource configurations of FIG. 10 in accordance with one embodiment of the present disclosure.

If the actual multiplexing capability of this IAB-node 802-*i* is locally changed from SDM to FDM, due to, for example, timing and/or interference environment variations, the IAB-node 802-*i* derives the valid frequency-domain H/S/NA configuration combining the provided time and frequency-domain configurations subject to the overriding rules stated above, resulting in a configuration as illustrated in FIG. 11.

If the actual multiplexing capability of this IAB-node 802-*i* is changed from SDM to TDM, the IAB-node 802-*i* only uses the provided time-domain resource configuration.

FIG. 12 is a flow chart that illustrates the operation of an IAB-node 802-*i* including an IAB-MT 804-*i* and an IAB-DU 806-*i* in accordance with embodiments of the present disclosure. Optional steps are represented by dashed lines/boxes. Also, while the steps are illustrated in a particular order, the steps may be performed in any order unless otherwise stated or required. As illustrated, the IAB-node 802-*i* determines a first multiplexing capability of the IAB node 802-*i* and sends the determined first multiplexing capability of the IAB-node 802-*i* to the IAB-donor-CU 803 (step 1200). The determined first multiplexing capability depicts how the IAB-MT 804-*i* and the IAB-DU 806-*i* can make use of overlapping (i.e., shared) time and/or frequency radio resources. In one embodiment, the determined first multiplexing capability can be any of TDM, FDM, or SDM. In another embodiment, the determined first multiplexing capability can be any of TDM required or TDM not required.

The IAB node 802-*i* receives a first baseline resource configuration profile for the IAB-node 802-*i* (step 1202). Note that the first baseline resource configuration profile may also more simply be referred to herein as a "first resource configuration profile". In one embodiment, the first baseline resource configuration profile comprises DL/UL/Flexible resource types. In one embodiment, the first baseline resource configuration profile comprises H/S/NA resource types associated with time-domain radio resources. In one embodiment, the H/S/NA resource types are associated with per-resource type DL/UL/Flexible in each slot. In one embodiment, the first baseline resource configuration profile is provided per cell and/or per link.

Optionally, the IAB node 802-*i* receives a second resource configuration profile of the IAB-DU 806-*i* depending on the sent first multiplexing capability of the IAB-node 802-*i* (step 1204). In one embodiment, the second resource configuration profile is received if the sent first multiplexing capability is FDM or SDM. In another embodiment, the second resource configuration profile is received if the sent first multiplexing capability is TDM not required. In one embodiment, the second resource configuration profile comprises H/S/NA resource types associated with frequency-domain radio resources. In one embodiment, the H/S/NA resource types are indicated for each slot or group of slots for every resource block (RB) group. In one embodiment, the second resource configuration profile is based on the first resource configuration profile. In one embodiment, the second resource configuration profile is provided per cell and/or per link.

The IAB-node 802-*i* determines a second actual multiplexing capability of the IAB node 802-*i* and determines a valid resource configuration according to the second actual multiplexing capability (step 1206). The second actual multiplexing capability can be (but not necessarily) different from the first actual multiplexing capability sent to the IAB-donor-CU 803. The second actual multiplexing capability depicts the current situation of how the IAB-MT 804-*i* and IAB-DU 806-*i* can make use of overlapping (i.e., shared) time and/or frequency radio resources. In one embodiment, the second actual multiplexing capability can be any of TDM, FDM, or SDM. As discussed above, in one embodiment, if the IAB-node 802-*i* receives more than one resource configuration profile, the determination is based on a combination of the received resource configuration profiles subject to certain overriding rules. For example, the overriding rules can be any of but not limited to:

NA resource classification cannot be overridden, whereas NA can override Hard and Soft classifications; Soft resource classification can override Hard classification and cannot be overridden by Hard classification; Hard resource classification cannot override NA nor Soft classification; or Hard resource classification cannot be overridden, whereas Hard can override Soft and NA classifications; Soft resource classification can override NA classification and cannot be overridden by NA classification; NA resource classification cannot override Hard nor Soft classification.

In another embodiment, if the IAB-node 802-*i* receives more than one resource configuration profile, the determination is based one of the received resource configuration profiles. In one embodiment, the valid resource configuration is determined per cell. In another embodiment, the valid resource configuration is determined per link.

In another embodiment, time- or frequency-domain resources for semi-static or cell-specific signals or channels, such as SS/PBCH block (SSB), Physical Random Access Channel (PRACH), periodical Channel State Information Reference Signal (CSI-RS), System Information (SI) and Scheduling Request (SR), are treated as Hard resources, even if time- or frequency-domain resources are configured NA or Soft.

Optionally, the IAB node 802-*i* sends the second actual multiplexing capability to a parent IAB node 802-*p* (step 1208).

Optionally, the IAB node 802-*i* sends the determined valid resource configuration (e.g., an indication of the determined valid resource configuration) to a parent IAB node 802-*p* (step 1210).

Optionally, the IAB node 802-*i* receives an acknowledgement (ACK) to assume the determined valid resource configuration (step 1212).

The IAB node 802-*i* schedules transmission on the child backhaul link(s) and access link(s) based on the determined valid resource configuration (step 1214).

Figure 13:
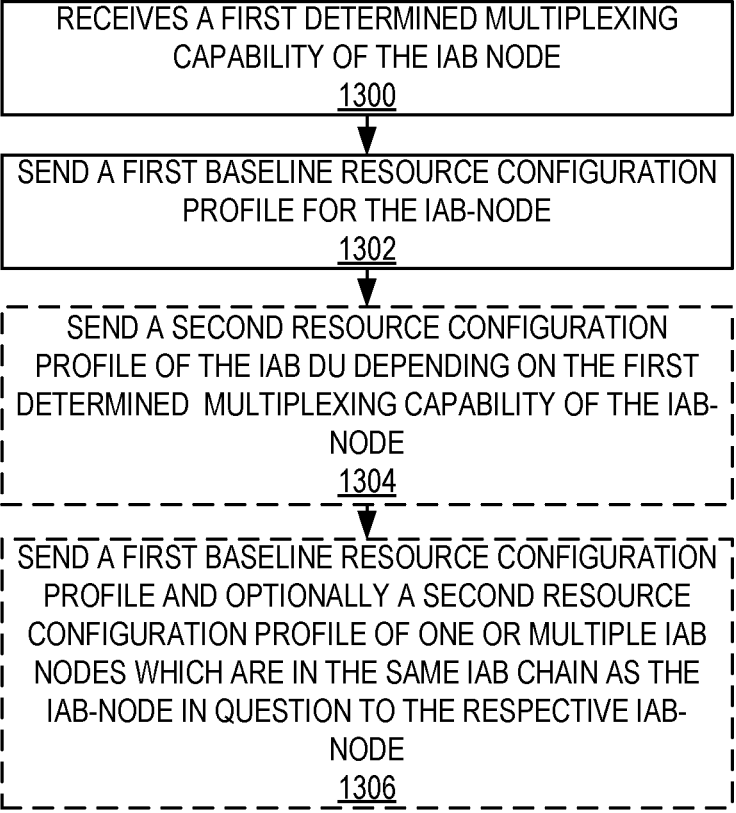
FIG. 13 is a flow chart that illustrates the operation of an IAB donor CU in accordance with embodiments of the present disclosure.

FIG. 13 is a flow chart that illustrates the operation of the IAB-donor-CU 803 in accordance with embodiments of the present disclosure. Optional steps are represented by dashed lines/boxes. Also, while the steps are illustrated in a particular order, the steps may be performed in any order unless otherwise stated or required. The IAB-donor-CU 803 is responsible for semi-static resource configuration of an IAB-node 802-*i*. The IAB-donor-CU 803 receives a first determined multiplexing capability of the IAB-node 802-*i* (step 1300). The IAB-donor-CU 803 sends, to the IAB node 802-*i*, a first baseline resource configuration to the IAB-node 802-*i* (step 1302). Optionally, the IAB-donor-CU 803 sends, to the IAB node 802-*i*, a second resource configuration profile of the IAB-DU 806-*i* depending on the first determined multiplexing capability of the IAB-node 802-*i* (step 1304). Optionally, the IAB-donor-CU 803 sends a first baseline resource configuration profile and optionally a second resource configuration profile of one or multiple IAB-nodes which are in the same IAB chain as the IAB-node 802-*i* in question to the respective IAB-node (step 1306).

FIG. 14 is a flow chart that illustrates the operation of a parent IAB node 802-*p* in accordance with embodiments of the present disclosure. Optional steps are represented by dashed lines/boxes. Also, while the steps are illustrated in a particular order, the steps may be performed in any order unless otherwise stated or required. The parent IAB node 802-*p* of an IAB-node 802-*i* receives a first baseline resource configuration profile of the IAB-DU 806-*i* (step 1400). Optionally, the parent IAB node 802-*p* receives a second resource configuration profile of the IAB-DU 806-*i* depending on a certain multiplexing capability of the IAB-node 802-*i* (step 1402). The parent IAB node 802-*p* receives a determined actual multiplexing capability of the IAB-node 802-*i* (step 1404). The parent IAB node 802-*p* determines a valid resource configuration of the IAB-DU 806-*i* (step 1406). In one embodiment, the determination is based on the received actual multiplexing capability of the IAB-node 802-*i*. In one embodiment, if the parent IAB node 802-*p* receives more than one resource configuration profile of the IAB-node 802-*i*, the determination is additionally based on a combination of the received resource configuration profiles subject to certain overriding rules. In another embodiment, if the parent IAB node 802-*p* receives more than one resource configuration profile of the IAB-DU 806-*i*, the determination is additionally based one of the received resource configuration profiles.

Optionally, the parent IAB node 802-*p* receives a valid resource configuration of the IAB-DU 806-*i* and, if so, the determined valid resource configuration in the previous step is disregarded (step 1408).

Optionally, the parent IAB node 802-*p* sends an ACK to the IAB node 802-*i* to assume the valid resource configuration of the IAB-DU 806-*i* (step 1410).

The parent IAB node 802-*p* schedules transmission on the parent backhaul link (i.e., the backhaul link between the parent IAB node 802-*p* and the IAB-node 802-*i*) based on the determined valid resource configuration of the IAB-DU 806-*i* and a determined valid resource configuration of the parent IAB-DU 806-*p* (step 1412).

Figure 15:
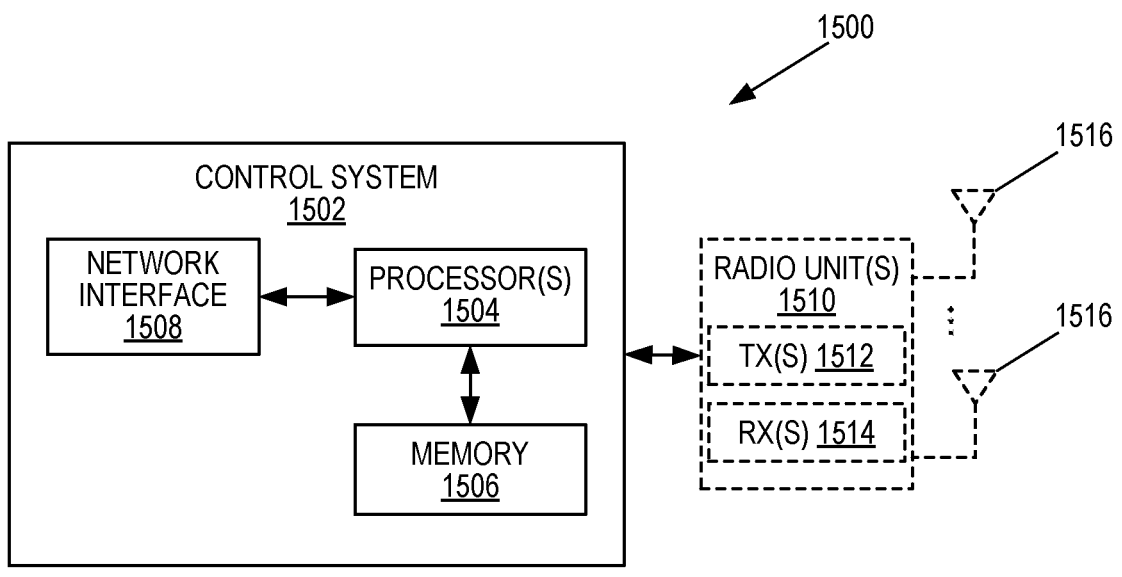
FIGS. 15 and 16 are schematic block diagrams of example embodiments of an IAB node.

FIG. 15 is a schematic block diagram of an IAB node 1500 according to some embodiments of the present disclosure. Optional features are represented by dashed boxes. The IAB node 1500 may be, for example, the IAB donor node 802-0 or one of the IAB nodes 802-1 through 802-N described herein. As illustrated, the IAB node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and optionally a network interface 1508. The one or more processors 1504 are also referred to herein as processing circuitry. In addition, the IAB node 1500 includes one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of the IAB node 1500 as described herein (e.g., one or more functions of the donor IAB node 802-0 or one or more functions of the IAB node 802-*i*, described above, e.g., with respect to FIGS. 12-14). In some embodiments, the function(s) are implemented in software that is stored, e.g., in the memory 1506 and executed by the one or more processors 1504.

Figure 16:
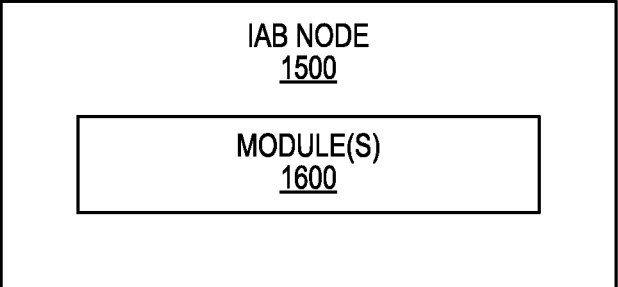

FIG. 16 is a schematic block diagram of the IAB node 1500 according to some other embodiments of the present disclosure. The IAB node 1500 includes one or more modules 1600, each of which is implemented in software. The module(s) 1600 provide the functionality of the IAB node 1500 described herein (e.g., one or more functions of the donor IAB node 802-0 or one or more functions of the IAB node 802-*i*, described above, e.g., with respect to FIGS. 12-14).

In some embodiments, a computer program including instructions which, when executed by at least one processor, causes the at least one processor to carry out the functionality of an IAB node 802 or a node one or more of functions of an IAB node according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
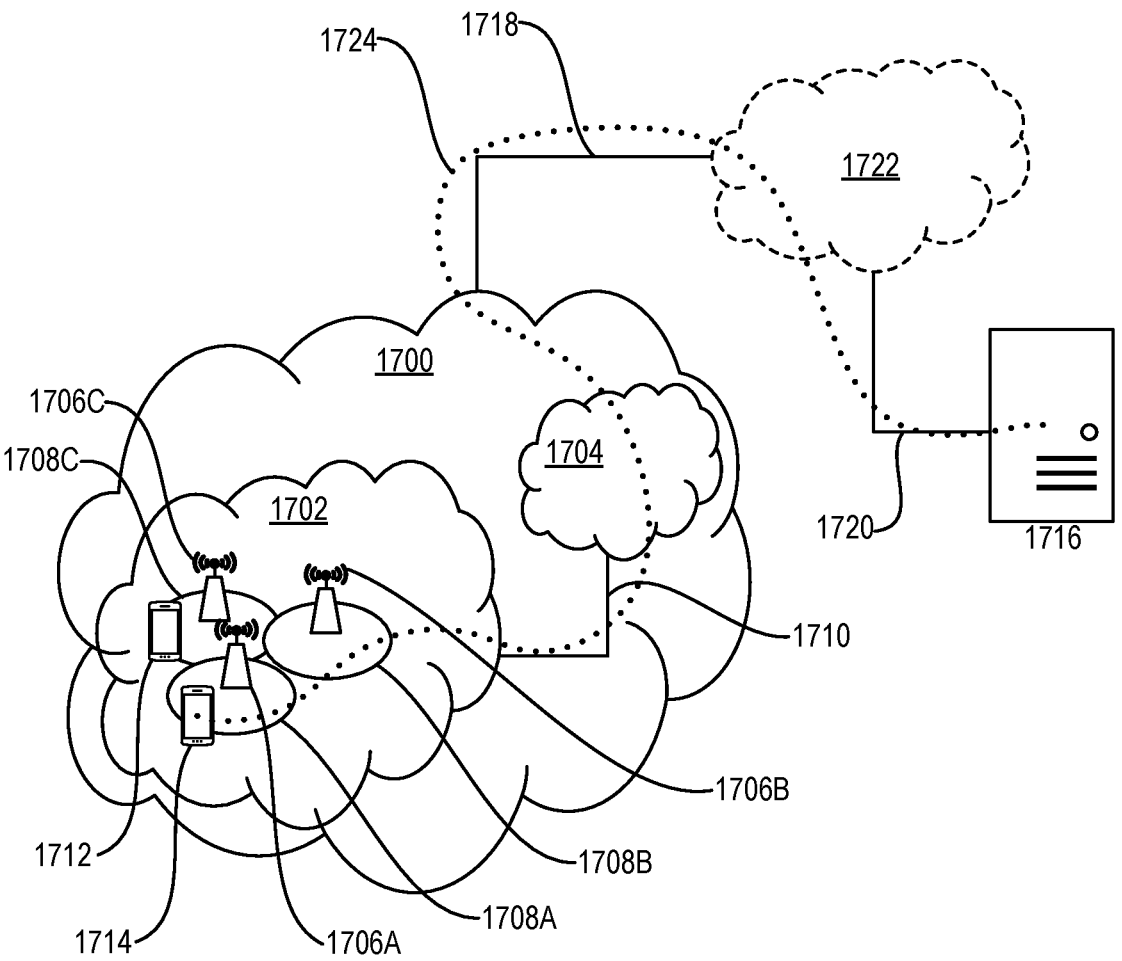
FIG. 17 illustrates one example of a communication system in which embodiments of the present disclosure may be implemented.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
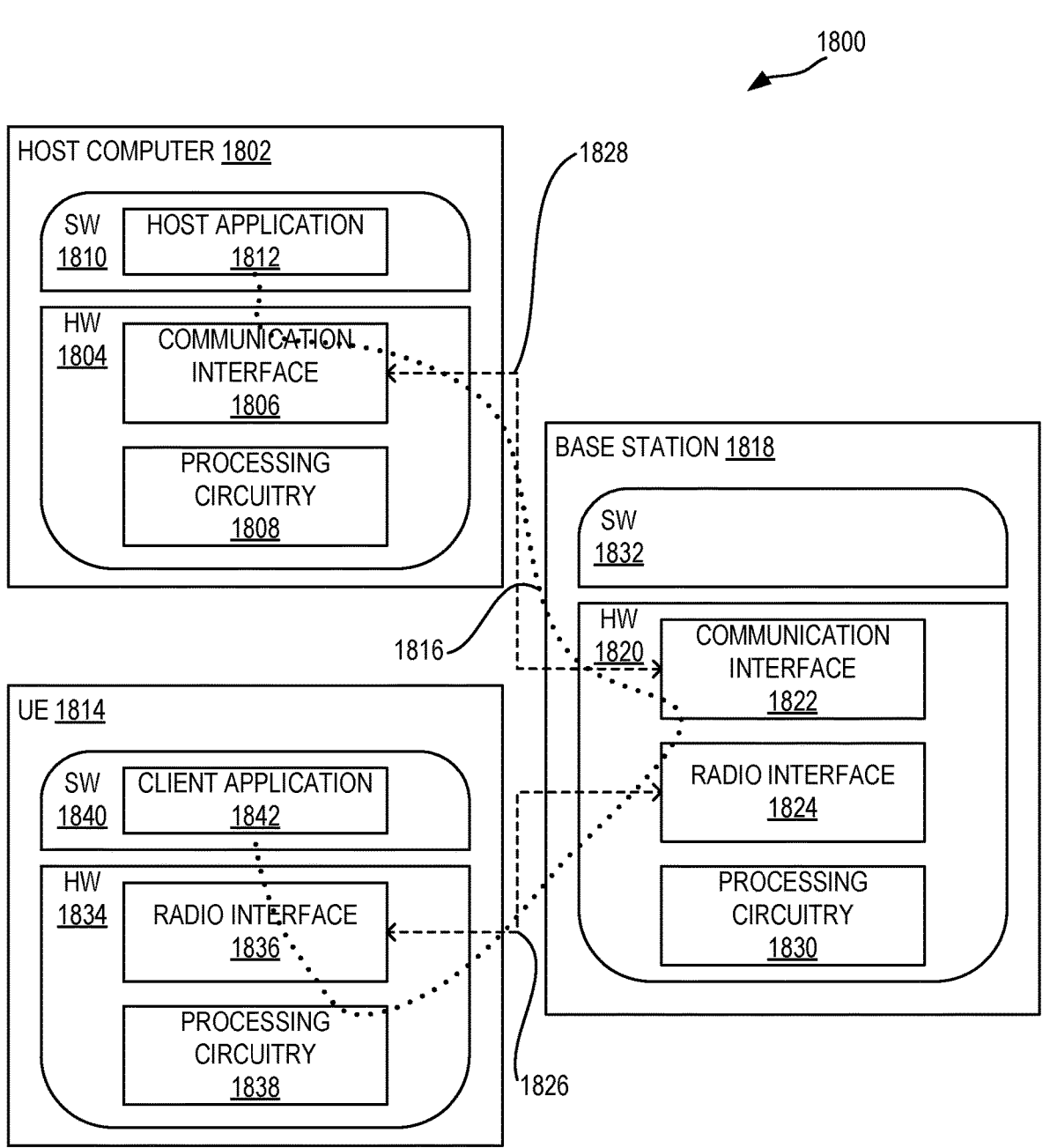
FIG. 18 illustrates example implementations of the User Equipment (UE), base station, and host computer of FIG. 17.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both.

While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
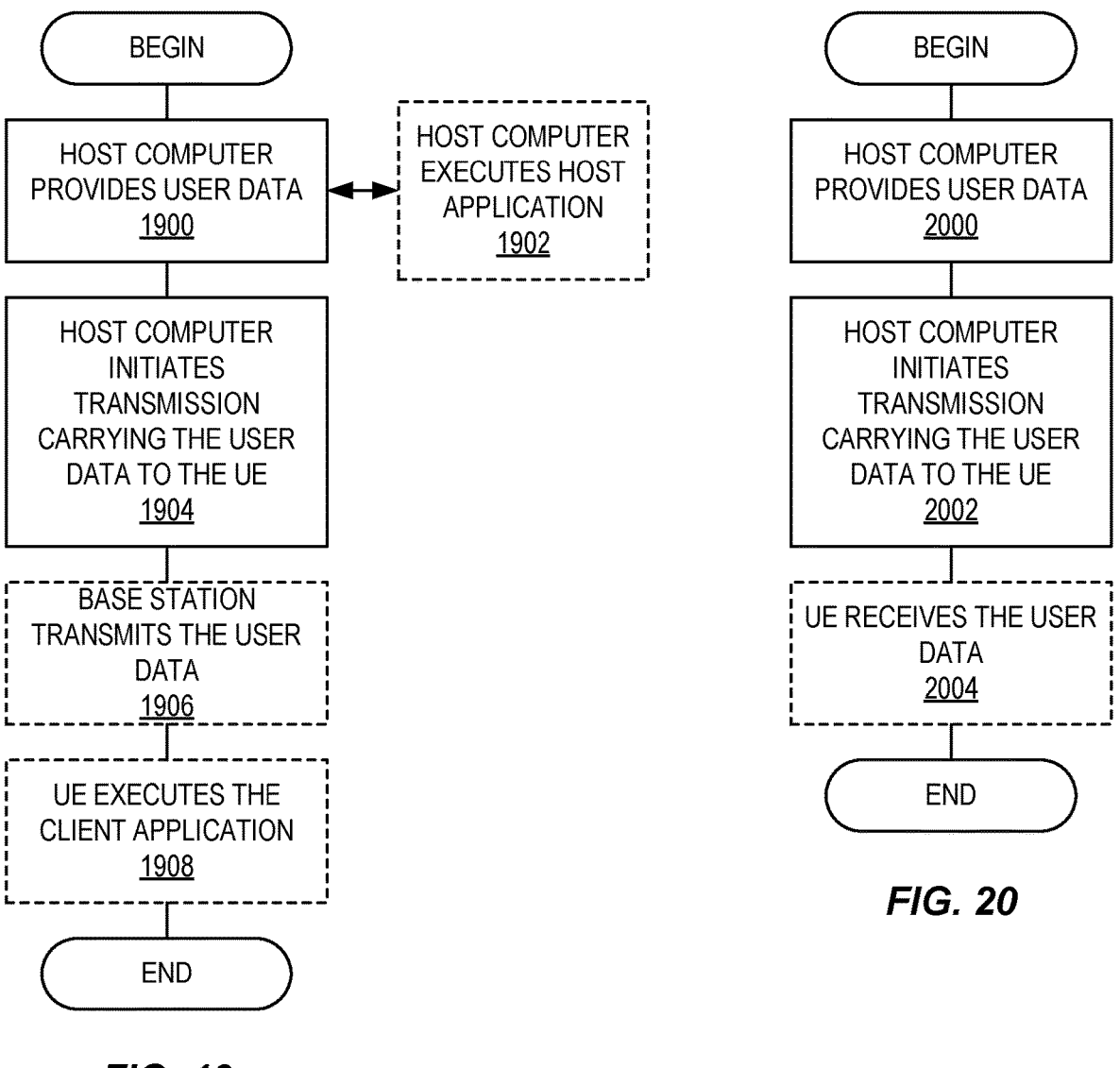
FIGS. 19, 20, 21, and 22 are flow charts that illustrate example methods that may be performed within the communication system of FIG. 17 in accordance with embodiments of the present disclosure.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

Figures 21, 22:
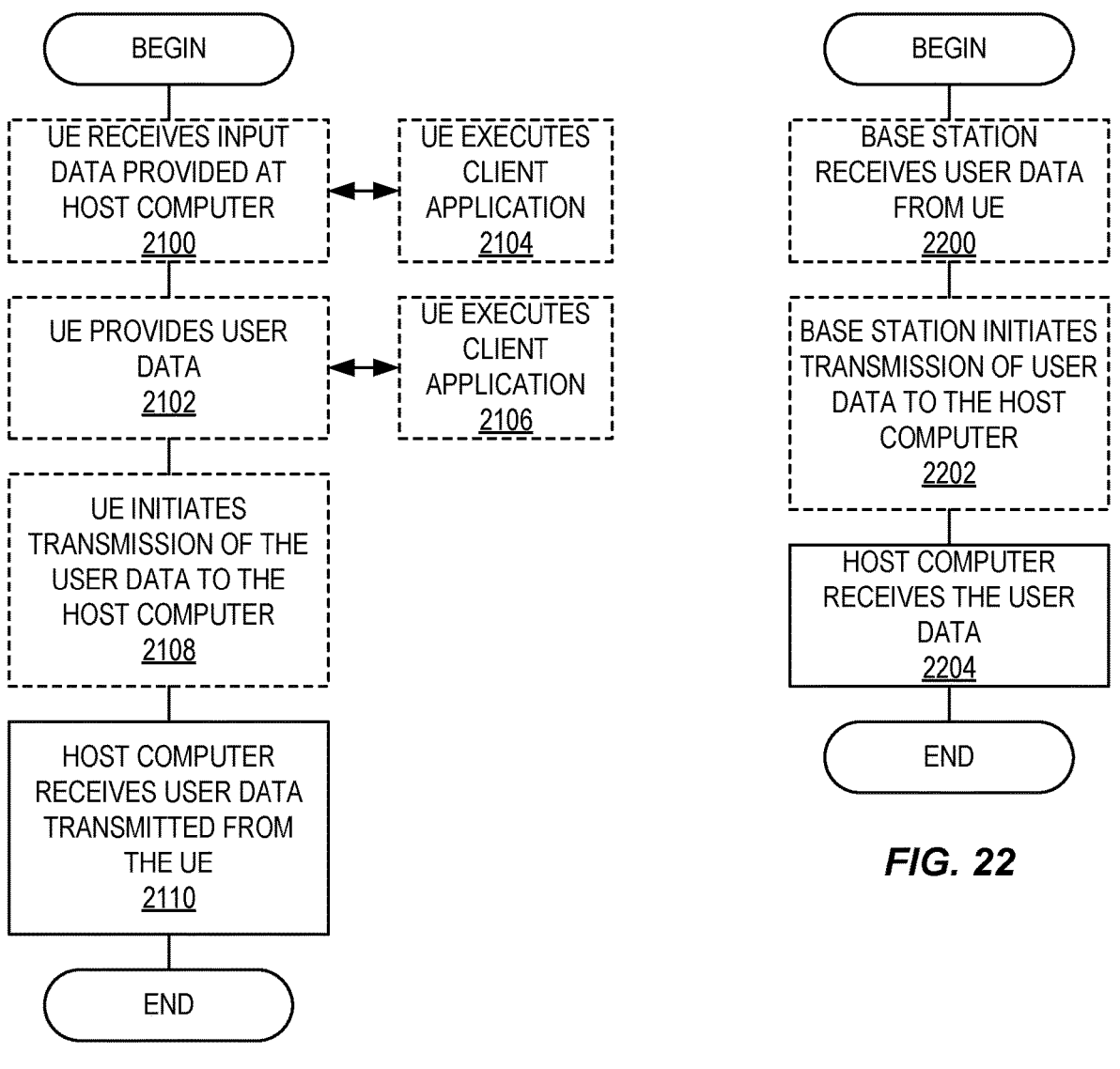

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by an Integrated Access Backhaul, IAB, node in a radio access network, the method comprising:
   determining a first multiplexing capability of the IAB node at a first time;
   sending information that is indicative of the first multiplexing capability of the IAB node at the first time to an IAB donor node;
   receiving a first resource configuration profile for the IAB node from the IAB donor node;
   determining a second actual multiplexing capability of the IAB node at a second time, the second time being subsequent to the first time;
   determining a valid resource configuration for the IAB node based on the second actual multiplexing capability of the IAB node; and
   scheduling transmission on one or more child backhaul links and/or one or more access links of the IAB node based on the valid resource configuration.

2. The method of claim 1 wherein each of the first multiplexing capability and the second actual multiplexing capability depicts how an IAB Mobile Termination, IAB-MT, of the IAB node and an IAB Distributed Unit, IAB-DU, of the IAB node can make use of shared time and/or frequency radio resources.

3. The method of claim 1 wherein each of the first multiplexing capability and second actual multiplexing capability is one of Time Division Multiplexing, TDM, or Frequency Division Multiplexing, FDM, or Spatial Division Multiplexing, SDM.

4. The method of claim 1 further comprising:
   receiving a second resource configuration profile for the IAB node from the IAB donor node;
   wherein determining the valid resource configuration for the IAB node comprises determining the valid resource configuration for the IAB node based on the second actual multiplexing capability of the IAB node and a combination of the first resource configuration profile and the second resource configuration profile subject to one or more predefined or preconfigured rules.

5. The method of claim 4 wherein:
   the first resource configuration profile comprises Hard, H, Soft, S, and Not Available, NA, resource classifications associated with time-domain resources;
   the second resource configuration profile comprises H, S, and NA resource classifications associated with frequency-domain resources; and
   the one or more predefined or preconfigured rules comprise one or more of the following rules:
      a rule that a H resource classification cannot be overridden;

a rule that a H resource classification can override a S resource classification and a NA resource classification;

a rule that a S resource classification can override a NA resource classification and cannot be overridden by a NA resource classification;

a rule that a NA resource classification cannot override a H resource classification nor a S resource classification.

6. The method of claim 1 further comprising:

receiving a second resource configuration profile for the IAB node from the IAB donor node;

wherein determining the valid resource configuration for the IAB node comprises determining the valid resource configuration for the IAB node based on the first resource configuration profile and/or the second resource configuration profile.

7. The method of claim 1 wherein determining the valid resource configuration for the IAB node comprises determining the valid resource configuration for the IAB node per cell.

8. The method of claim 1 wherein determining the valid resource configuration for the IAB node comprises determining the valid resource configuration for the IAB node per link.

9. The method of claim 1 wherein time- or frequency-domain resources for semi-static or cell-specific signals or channels, such as Synchronization Signal (SS)/Physical Broadcast Channel (PBCH) block (SSB), Physical Random Access Channel (PRACH), periodical Channel State Information Reference Signal (CSI-RS), System Information (SI), and Scheduling Request (SR), are treated as Hard (H) resources, even if Not Available (NA) or Soft(S) resource is configured.

10. The method of claim 1 further comprising sending the second actual multiplexing capability to a parent IAB node.

11. An Integrated Access Backhaul, IAB, node for a radio access network, wherein the IAB node:

determines a first multiplexing capability of the IAB node at a first time;

sends information that is indicative of the first multiplexing capability of the IAB node at the first time to an IAB donor node;

receives a first resource configuration profile for the IAB node from the IAB donor node;

determines a second actual multiplexing capability of the IAB node at a second time, the second time being subsequent to the first time;

determines a valid resource configuration for the IAB node based on the second actual multiplexing capability of the IAB node; and schedules transmission on one or more child backhaul links and/or one or more access links of the IAB node based on the valid resource configuration.

12. A method performed by a parent Integrated Access Backhaul, IAB, node in a radio access network, the method comprising:

receiving a first resource configuration profile of an IAB node, the IAB node being a child IAB node of the parent IAB node;

receiving an actual multiplexing capability of the IAB node;

determining a valid resource configuration of the IAB node based on the actual multiplexing capability of the IAB node; and scheduling transmission on a parent backhaul link based on the valid resource configuration of the IAB node and a determined valid resource configuration of the parent IAB node.

13. A parent Integrated Access Backhaul, IAB, node for a radio access network, wherein the parent IAB node:

receives a first resource configuration profile of an IAB node, the IAB node being a child IAB node of the parent IAB node;

receives an actual multiplexing capability of the IAB node;

determines a valid resource configuration of the IAB node based on the actual multiplexing capability of the IAB node; and schedules transmission on a parent backhaul link based on the valid resource configuration of the IAB node and a determined valid resource configuration of the parent IAB node.

*　　*　　*　　*　　*